US008832630B2

(12) United States Patent
Ohtsuka et al.

(10) Patent No.: US 8,832,630 B2
(45) Date of Patent: Sep. 9, 2014

(54) APPARATUS AND METHOD FOR AIDING IN DESIGNING ELECTRONIC CIRCUITS

(75) Inventors: Ikuo Ohtsuka, Yokohama (JP); Toshiyasu Sakata, Hino (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/555,245

(22) Filed: Jul. 23, 2012

(65) Prior Publication Data
US 2013/0031525 A1 Jan. 31, 2013

(30) Foreign Application Priority Data

Jul. 28, 2011 (JP) .................................. 2011-165342

(51) Int. Cl.
*G06F 17/50* (2006.01)
*H05K 3/00* (2006.01)

(52) U.S. Cl.
CPC ........ *G06F 17/5077* (2013.01); *G06F 2217/40* (2013.01); *H05K 3/0005* (2013.01)
USPC ........... 716/122; 716/110; 716/112; 716/115; 716/118; 716/119; 716/132; 716/139

(58) Field of Classification Search
USPC ......... 716/110, 112, 115, 118, 119, 122, 132, 716/139
See application file for complete search history.

(56) References Cited

U.S. PATENT DOCUMENTS

| | | | | |
|---|---|---|---|---|
| 5,452,239 A | * | 9/1995 | Dai et al. ......................... | 703/19 |
| 5,910,899 A | * | 6/1999 | Barrientos ..................... | 716/118 |
| 6,058,252 A | * | 5/2000 | Noll et al. ...................... | 716/113 |
| 6,230,109 B1 | * | 5/2001 | Miskimins et al. ........... | 702/109 |
| 6,584,608 B1 | * | 6/2003 | Kumada et al. ................ | 716/129 |
| 6,631,509 B2 | * | 10/2003 | Nakayama et al. ........... | 716/122 |
| 6,775,710 B1 | * | 8/2004 | Hamamura .................... | 709/238 |
| 7,039,892 B2 | * | 5/2006 | Mantey et al. ................. | 716/102 |
| 7,120,885 B2 | * | 10/2006 | Nakayama et al. ........... | 716/115 |
| 7,322,019 B2 | * | 1/2008 | Sato et al. ...................... | 716/112 |

(Continued)

FOREIGN PATENT DOCUMENTS

| | | |
|---|---|---|
| JP | 04-115368 | 4/1992 |
| JP | 05-181935 | 7/1993 |

(Continued)

OTHER PUBLICATIONS

Lijuan Luo et al., "B-Escape: A Simultaneous Escape Routing Algorithm Based on Boundary Routing," Proceedings of the 19th International Symposium on Physical Design, Mar. 14-17, 2010, pp. 19-25, Association for Computing Machinery, San Francisco, California.

*Primary Examiner* — Helen Rossoshek
(74) *Attorney, Agent, or Firm* — Fujitsu Patent Center

(57) ABSTRACT

First and second pin groups are each formed from a plurality of pins associated with specific nets. Pins in the first pin group are to be wired to pins in the second pin group according to their associated nets. A candidate selection unit selects a set of pair candidates each specifying a first pair of pins in the first pin group and a second pair of pins in the second pin group. The first and second pairs of pins are associated with the same pair of nets, and their respective distances are within a specified range. A pair determination unit determines which pins in the first and second pin groups are to be wired in pairs, based on the pair candidates selected by the candidate selection unit.

8 Claims, 44 Drawing Sheets

(56) References Cited

U.S. PATENT DOCUMENTS

| | | | |
|---|---|---|---|
| 7,392,146 B2 * | 6/2008 | Nozuyama | 702/117 |
| 7,398,497 B2 * | 7/2008 | Sato et al. | 716/112 |
| 7,418,683 B1 * | 8/2008 | Sonnard et al. | 716/122 |
| 7,721,036 B2 * | 5/2010 | Poplack et al. | 710/305 |
| 7,757,196 B2 * | 7/2010 | Bird et al. | 716/125 |
| 7,966,138 B2 * | 6/2011 | Nozuyama | 702/59 |
| 7,992,121 B2 * | 8/2011 | Gupta et al. | 716/128 |
| 8,201,136 B2 * | 6/2012 | Kumagai | 716/139 |
| 8,510,698 B2 * | 8/2013 | Kumagai | 716/119 |
| 2001/0038612 A1 * | 11/2001 | Vaughn et al. | 370/256 |
| 2008/0141205 A1 * | 6/2008 | Kumagai | 716/11 |
| 2009/0178017 A1 * | 7/2009 | Gupta et al. | 716/15 |
| 2012/0198408 A1 * | 8/2012 | Chopra | 716/127 |

FOREIGN PATENT DOCUMENTS

| | | |
|---|---|---|
| JP | 09-044539 | 2/1997 |
| JP | 2002-217302 | 8/2002 |
| JP | 2004-265436 | 9/2004 |

\* cited by examiner

FIG. 5

12a NET LIST

| PIN ID | PIN GROUP ID | NET | COORDI-NATES | PAIR PIN ID |
|---|---|---|---|---|
| 1 | L | A | (1,1) | |
| 2 | L | B | (1,3) | |
| 3 | L | C | (1,4) | |
| 4 | L | D | (2,2) | |
| 5 | L | E | (2,3) | |
| 6 | L | F | (3,1) | |
| 7 | L | G | (3,2) | |
| 8 | L | H | (3,4) | |
| 9 | L | I | (4,1) | |
| 10 | L | J | (5,2) | |
| 11 | L | K | (5,3) | |
| 12 | L | L | (6,1) | |
| 13 | L | M | (6,2) | |
| 14 | R | A | (10,3) | |
| 15 | R | B | (9,3) | |
| 16 | R | C | (9,4) | |
| 17 | R | D | (10,2) | |
| 18 | R | E | (8,4) | |
| 19 | R | F | (9,1) | |
| 20 | R | G | (8,1) | |
| 21 | R | H | (7,3) | |
| 22 | R | I | (8,2) | |
| 23 | R | J | (7,2) | |
| 24 | R | K | (5,4) | |
| 25 | R | L | (6,3) | |
| 26 | R | M | (6,4) | |
| 27 | L | N | (6,4) | 28 |
| 28 | L | O | (5,5) | 27 |
| 29 | R | N | (4,1) | 30 |
| 30 | R | O | (5,2) | 29 |

FIG. 6

16a  SOURCE PIN DISTANCE TABLE

| PIN ID (NET) | 1(A) | 2(B) | 3(C) | 4(D) | 5(E) | 6(F) | 7(G) | 8(H) | 9(I) | 10(J) | 11(K) | 12(L) | 13(M) |
|---|---|---|---|---|---|---|---|---|---|---|---|---|---|
| 1(A) | - | 2 | 3 | √2 | √5 | 2 | √5 | √13 | 3 | √17 | 2√5 | 5 | √26 |
| 2(B) |  | - | 1 | √2 | 1 | >2 | >2 | >2 | >2 | >2 | >2 | >2 | >2 |
| 3(C) |  |  | - | >2 | √2 | >2 | >2 | >2 | >2 | >2 | >2 | >2 | >2 |
| 4(D) |  |  |  | - | 1 | √2 | 1 | 2 | >2 | >2 | >2 | >2 | >2 |
| 5(E) |  |  |  |  | - | √2 | √2 | >2 | >2 | >2 | >2 | >2 | >2 |
| 6(F) |  |  |  |  |  | - | 1 | >2 | 1 | >2 | >2 | >2 | >2 |
| 7(G) |  |  |  |  |  |  | - | 2 | √2 | 2 | >2 | >2 | >2 |
| 8(H) |  |  |  |  |  |  |  | - | >2 | 1 | >2 | >2 | >2 |
| 9(I) |  |  |  |  |  |  |  |  | - | 1 | 1 | 2 | 1 |
| 10(J) |  |  |  |  |  |  |  |  |  | - | 1 | √2 | √2 |
| 11(K) |  |  |  |  |  |  |  |  |  |  | - | >2 | 1 |
| 12(L) |  |  |  |  |  |  |  |  |  |  |  | - | - |
| 13(M) |  |  |  |  |  |  |  |  |  |  |  |  | - |

PIN ID (NET)

FIG. 7

16b  TARGET PIN DISTANCE TABLE

| PIN ID (NET) | 14(A) | 15(B) | 16(C) | 17(D) | 18(E) | 19(F) | 20(G) | 21(H) | 22(I) | 23(J) | 24(K) | 25(L) | 26(M) |
|---|---|---|---|---|---|---|---|---|---|---|---|---|---|
| 14(A) | - | | | | | | | | | | | | |
| 15(B) | 1 | - | | | | | | | | | | | |
| 16(C) | | 1 | - | | | | | | | | | | |
| 17(D) | | 1 | $\sqrt{2}$ | - | | | | | | | | | |
| 18(E) | | | 1 | $\sqrt{2}$ | - | | | | | | | | |
| 19(F) | | | | | 1 | - | | | | | | | |
| 20(G) | | | | | | $\sqrt{2}$ | - | | | | | | |
| 21(H) | | | | | | | $\sqrt{2}$ | - | | | | | |
| 22(I) | | | | | | | 1 | $\sqrt{2}$ | - | | | | |
| 23(J) | | | | | | | | 1 | $\sqrt{2}$ | - | | | |
| 24(K) | | | | | | | | | | 1 | - | | |
| 25(L) | | | | | | | | | | | $\sqrt{2}$ | - | |
| 26(M) | | | | | | | | | | 1 | 1 | | - |

FIG. 9
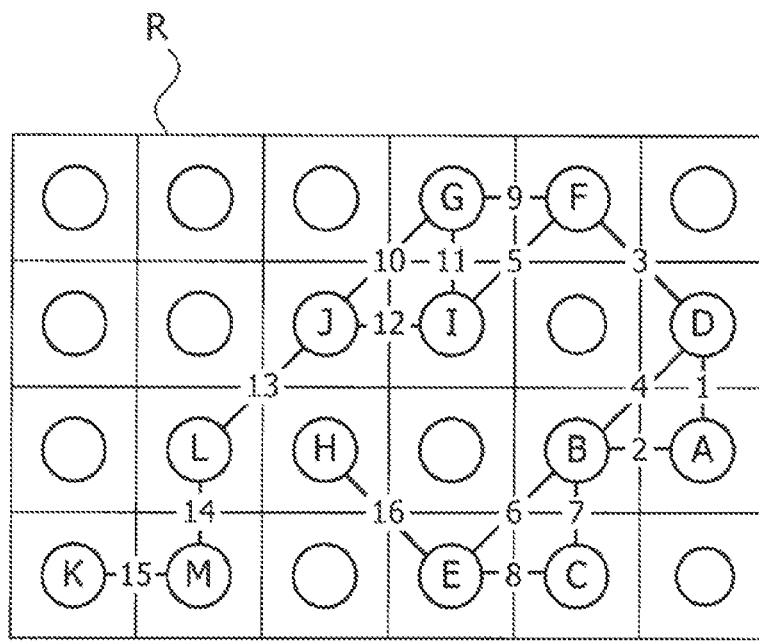
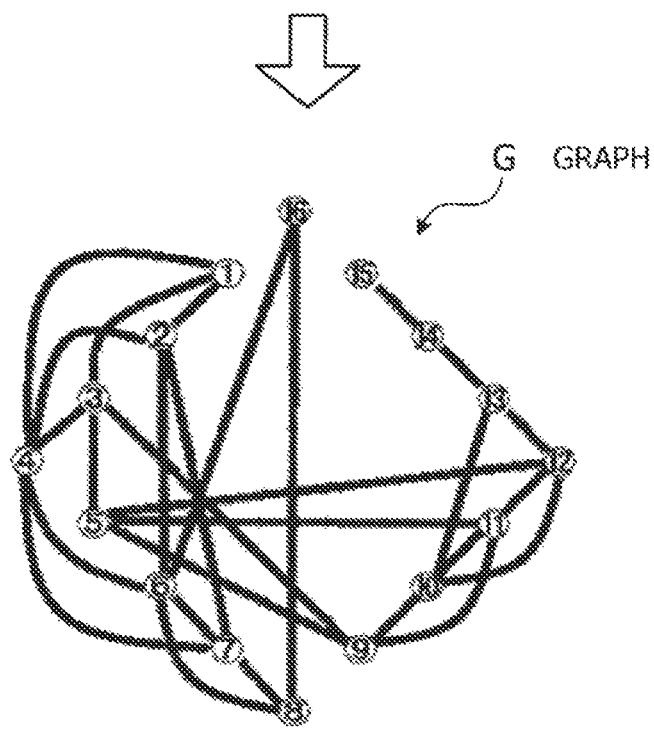

FIG. 10    17a  GRAPH MANAGEMENT TABLE

| GVID | NET PAIR | CHOICE | SEQ NO. | DEGREE | ADJACENT VERTEX | EDGE DISTANCE | | | ABANDONED DISTANCE | | |
|---|---|---|---|---|---|---|---|---|---|---|---|
| | | | | | | L | R | TOTAL | L | R | TOTAL |
| 1 | A,D | -- | | 3 | 3,4,2 | 1.4 | 1 | 2.4 | 4.8 | 3.8 | 8.6 |
| 2 | A,B | -- | | 4 | 4,6,7,1 | 2 | 1 | 3 | 4.8 | 4.8 | 9.6 |
| 3 | D,F | -- | | 4 | 9,5,1,4 | 1.4 | 1.4 | 2.8 | 4.8 | 4.8 | 9.6 |
| 4 | B,D | -- | | 5 | 1,3,2,7,6 | 1.4 | 1.4 | 2.8 | 6.8 | 5.8 | 12.6 |
| 5 | F,I | -- | | 4 | 11,12,9,3 | 1 | 1.4 | 2.4 | 5.2 | 4.4 | 9.6 |
| 6 | B,E | -- | | 5 | 16,8,4,2,7 | 1 | 1.4 | 2.4 | 7.2 | 5.8 | 13 |
| 7 | B,C | -- | | 4 | 2,4,6,8 | 1 | 1 | 2 | 5.8 | 4.8 | 10.6 |
| 8 | C,E | -- | | 3 | 6,16,7 | 1.4 | 1 | 2.4 | 3.4 | 3.8 | 7.2 |
| 9 | F,G | -- | | 4 | 10,11,3,5 | 1 | 1 | 2 | 5.8 | 5.2 | 11 |
| 10 | G,J | -- | | 4 | 9,11,12,13 | 2 | 1.4 | 3.4 | 5.2 | 4.4 | 9.6 |
| 11 | G,I | -- | | 4 | 9,10,12,5 | 1.4 | 1 | 2.4 | 5.4 | 4.8 | 10.2 |
| 12 | I,J | -- | | 4 | 10,13,11,5 | 1.4 | 1.4 | 2.8 | 5.8 | 5.2 | 11 |
| 13 | J,L | -- | | 3 | 10,12,14 | 1.4 | 1.4 | 2.8 | 4.4 | 3.4 | 7.8 |
| 14 | L,M | -- | | 2 | 13,15 | 1 | 1 | 2 | 2.8 | 2.4 | 5.2 |
| 15 | K,M | -- | | 1 | 14 | 1.4 | 1 | 2.4 | 1 | 1 | 2 |
| 16 | E,H | -- | | 2 | 6,8 | 1.4 | 1.4 | 2.8 | 2.4 | 2.4 | 4.8 |

GRAPH MANAGEMENT TABLE

| GVID | NET PAIR | CHOICE | SEQ NO. | DEGREE | ADJACENT VERTEX | EDGE DISTANCE | | | ABANDONED DISTANCE | | |
|---|---|---|---|---|---|---|---|---|---|---|---|
| | | | | | | L | R | TOTAL | L | R | TOTAL |
| 1 | A,D | -- | | 3 | 3,4,2 | 1.4 | 1 | 2.4 | 4.8 | 3.8 | 8.6 |
| 2 | A,B | -- | | 4 | 4,6,7,1 | 2 | 1 | 3 | 4.8 | 4.8 | 9.6 |
| 3 | D,F | -- | | 4 | 9,5,1,4 | 1.4 | 1.4 | 2.8 | 4.8 | 4.8 | 9.6 |
| 4 | B,D | -- | | 5 | 1,3,2,7,6 | 1.4 | 1.4 | 2.8 | 6.8 | 5.8 | 12.6 |
| 5 | F,I | -- | | 4 | 11,12,9,3 | 1 | 1.4 | 2.4 | 5.2 | 4.4 | 9.6 |
| 6 | B,E | -- | | 5 | 16,8,4,2,7 | 1 | 1.4 | 2.4 | 7.2 | 5.8 | 13 |
| 7 | B,C | -- | | 4 | 2,4,6,8 | 1 | 1 | 2 | 5.8 | 4.8 | 10.6 |
| 8 | C,E | -- | | 3 | 6,16,7 | 1.4 | 1 | 2.4 | 3.4 | 3.8 | 7.2 |
| 9 | F,G | -- | | 4 | 10,11,3,5 | 1 | 1 | 2 | 5.8 | 5.2 | 11 |
| 10 | G,J | -- | | 4 | 9,11,12,13 | 2 | 1.4 | 3.4 | 5.2 | 4.4 | 9.6 |
| 11 | G,I | -- | | 4 | 9,10,12,5 | 1.4 | 1 | 2.4 | 5.4 | 4.8 | 10.2 |
| 12 | I,J | -- | | 4 | 10,13,11,5 | 1.4 | 1 | 2.4 | 5.8 | 5.2 | 11 |
| 13 | J,L | -- | | 4 | 10,12,🗙 | 1.4 | 1.4 | 2.8 | (J+1)=2+1.4 | 1.4+1 | 5.8 |
| 14 | L,M | NO | | 2<3 | 10,12,🗙 | 1.4 | 1 | 2.4 | 2.8 | 2.4 | 5.2 |
| 15 | K,M | YES | 1 | 1 | 14 | 1.4 | 1 | 2.4 | 1 | 1 | 2 |
| 16 | E,H | -- | | 2 | 6,8 | 1.4 | 1.4 | 2.8 | 2.4 | 2.4 | 4.8 |

FIG. 12

17a GRAPH MANAGEMENT TABLE

| GVID | NET PAIR | CHOICE | SEQ NO. | DEGREE | ADJACENT VERTEX | EDGE DISTANCE | | | ABANDONED DISTANCE | | |
|---|---|---|---|---|---|---|---|---|---|---|---|
| | | | | | | L | R | TOTAL | L | R | TOTAL |
| 1 | A,D | -- | | 3 | 3,4,2 | AD=1,4 | 1 | 2,4 | ... | ... | ... |
| 2 | A,B | -- | | 4 | 4,6,7,1 | ... | ... | ... | ... | ... | ... |
| 3 | D,F | -- | | 4 | 9,5,1,4 | ... | ... | ... | ... | ... | ... |
| 4 | B,D | -- | | 5 | 1,3,2,7,6 | ... | ... | ... | ... | ... | ... |
| 5 | F,I | -- | | 4 | 11,12,9,3 | ... | ... | ... | ... | ... | ... |
| 6 | B,E | -- | | 5 | 16,8,4,2,7 | ... | ... | ... | ... | ... | ... |
| 7 | B,C | -- | | 4 | 2,4,6,8 | ... | ... | ... | ... | ... | ... |
| 8 | C,E | -- | | 3 | 6,16,7 | ... | ... | ... | ... | ... | ... |
| 9 | F,G | -- | | 4 | 10,11,3,5 | ... | ... | ... | ... | ... | ... |
| 10 | G,J | -- | | 4 | 9,11,12,13 | ... | ... | ... | ... | ... | ... |
| 11 | G,I | -- | | 4 | 9,10,12,5 | ... | ... | ... | ... | ... | ... |
| 12 | I,J | -- | | 4 | 10,13,11,5 | ... | ... | ... | ... | ... | ... |
| 13 | J,L | YES | 2 | 2<3 | 10,12,14 | JL=1,4 | 1,4 | 2,8 | GJ+IJ=2+1,4 | 1,4+1 | 5,8 |
| 14 | L,M | NO | | | 13,15 | | | | | | |
| 15 | K,M | YES | 1 | | 14 | | | | | | |
| 16 | E,H | -- | | 2 | 6,8 | EH=1,4 | 1,4 | 2,8 | BE+CE=1+1,4 | 1,4+1 | 4,8 |

FIG. 13

17a GRAPH MANAGEMENT TABLE

| GVID | NET PAIR | CHOICE | SEQ NO. | DEGREE | ADJACENT VERTEX | EDGE DISTANCE | | | ABANDONED DISTANCE | | |
|---|---|---|---|---|---|---|---|---|---|---|---|
| | | | | | | L | R | TOTAL | L | R | TOTAL |
| 1 | A,D | -- | | 3 | 3,4,2 | AD=1.4 | 1 | 2.4 | ... | ... | ... |
| 2 | A,B | -- | | 4 | 4,6,7,1 | ... | ... | ... | ... | ... | ... |
| 3 | D,F | -- | | 4 | 9,5,1,4 | ... | ... | ... | ... | ... | ... |
| 4 | B,D | -- | | 5 | 1,3,2,7,6 | ... | ... | ... | ... | ... | ... |
| 5 | F,I | -- | | 3<4 | 11,9,3 | ... | ... | ... | ... | ... | ... |
| 6 | B,E | -- | | 5 | 16,8,4,2,7 | ... | ... | ... | ... | ... | ... |
| 7 | B,C | -- | | 4 | 2,4,6,8 | ... | ... | ... | ... | ... | ... |
| 8 | C,E | -- | | 3 | 6,16,7 | ... | ... | ... | ... | ... | ... |
| 9 | F,G | -- | | 3<4 | 10,11,3,5 | ... | ... | ... | ... | ... | ... |
| 10 | G,J | NO | | 4 | 9,11,12,13 | ... | ... | ... | ... | ... | ... |
| 11 | G,I | YES | 3 | 2<4 | 9,10,10,5 | GI=1.4 | 1 | 2.4 | ... | ... | ... |
| 12 | J,I | NO | | 4 | 10,13,11,15 | ... | 1.4 | 2.8 | GJ+IJ=2+1.4 | 1.4+1 | 5.8 |
| 13 | J,L | YES | 2 | 2<3 | 10,12,14 | JL=1.4 | 1.4 | 2.8 | ... | ... | ... |
| 14 | L,M | NO | | 2 | 13,15 | ... | ... | ... | ... | ... | ... |
| 15 | K,M | YES | 1 | 2 | 14 | ... | ... | ... | ... | ... | ... |
| 16 | E,H | -- | | 2 | 6,8 | EH=1.4 | 1.4 | 2.8 | BE+CE=1+1.4 | 1.4+1 | 4.8 |

FIG. 14

17a GRAPH MANAGEMENT TABLE

| GVID | NET PAIR | CHOICE | SEQ NO. | DEGREE | ADJACENT VERTEX | EDGE DISTANCE L | EDGE DISTANCE R | EDGE DISTANCE TOTAL | ABANDONED DISTANCE L | ABANDONED DISTANCE R | ABANDONED DISTANCE TOTAL |
|---|---|---|---|---|---|---|---|---|---|---|---|
| 1 | A,D | — | | 3 | 3,4,2 | AD=1.4 | 1 | 2.4 | ... | ... | ... |
| 2 | A,B | — | | 4 | 4,6,7,1 | ... | ... | ... | ... | ... | ... |
| 3 | D,F | YES | 4 | (2<4) | XX,1,4 | DF=1.4 | 1.4 | (2.8) | AD+BD=1.4+1.4 | 1+1.4 | (5.2) |
| 4 | B,D | — | | 5 | 1,3,2,7,6 | ... | ... | ... | ... | ... | ... |
| 5 | F,I | NO | | 3,4 | 10,11,9,3 | | | | | | |
| 6 | B,E | — | | 5 | 16,8,4,2,7 | ... | ... | ... | ... | ... | ... |
| 7 | B,C | — | | 4 | 2,4,6,8 | ... | ... | ... | ... | ... | ... |
| 8 | C,E | — | | 3 | 6,16,7 | ... | ... | ... | ... | ... | ... |
| 9 | F,G | NO | | 3,4 | 10,11,3,5 | | | | | | |
| 10 | G,I | NO | | 4 | 9,11,12,13 | | | | | | |
| 11 | G,I | YES | 3 | (2<3) | 9,10,X,5 | GI=1.4 | 1 | 2.4 | | | |
| 12 | J,I | NO | | 4 | 9,10,13,15 | | | | | | |
| 13 | J,L | YES | 2 | (2<3) | 10,12,14 | JL=1.4 | 1.4 | 2.8 | | | |
| 14 | L,M | NO | | 2 | 13,15 | | | | | | |
| 15 | K,M | YES | 1 | 2 | 13,14 | | | | (2)+1=1.4 | 1.4+1 | 5.8 |
| 16 | E,H | — | | (2) | 6,8 | EH=1.4 | 1.4 | (2.8) | BE+CE=1+1.4 | 1.4+1 | (4.8) |

FIG. 15

17a GRAPH MANAGEMENT TABLE

| GVID | NET PAIR | CHOICE | SEQ NO. | DEGREE | ADJACENT VERTEX | EDGE DISTANCE | | | ABANDONED DISTANCE | | |
|---|---|---|---|---|---|---|---|---|---|---|---|
| | | | | | | L | R | TOTAL | L | R | TOTAL |
| 1 | A,D | NO | | 3 | 3,4,2 | AD=1.4 | 1 | 2.4 | ... | ... | ... |
| 2 | A,B | — | | 2<4 | X,6,7,X | AB=2 | 1 | ③ | ... | ... | ... |
| 3 | D,F | YES | 4 | 2,4 | X,6,X,2 | DF=1.4 | 1.4 | 2.8 | AD+BD=1.4+1.4 | 1.4+1.4 | 5.2 |
| 4 | | NO | | | | | | | | | |
| 5 | | NO | | 3<4 | | | | | | | |
| 6 | B,E | — | | 4<5 | 16,8,X,2,7 | | | | | | |
| 7 | B,C | — | | 3<4 | 2,X,6,8 | | | | | | |
| 8 | C,E | — | | 3 | 6,16,7 | | | | | | |
| 9 | | NO | | 3<4 | | | | | | | |
| 10 | | NO | | 4 | | | | | | | |
| 11 | G,I | YES | 3 | 2,1 | X,X,X,5 | GI=1.4 | 1 | 2.4 | ... | ... | ... |
| 12 | | NO | | 4 | | | | | | | |
| 13 | J,L | YES | 2 | 2<3 | 10,12,X | JL=1.4 | 1.4 | 2.8 | GJ+IJ=2+1.4 | 1.4+1.4 | 5.8 |
| 14 | | NO | | 2 | 13,15 | | | | | | |
| 15 | K,M | YES | 1 | 1 | 14 | | | | | | |
| 16 | E,H | YES | 5 | ② | 6,8 | EH=1.4 | 1.4 | ②.⑧ | BE+CE=1+1.4 | 1.4+1.4 | 4.8 |

FIG. 16

17a GRAPH MANAGEMENT TABLE

| GVID | NET PAIR | CHOICE | SEQ NO. | DEGREE | ADJACENT VERTEX | EDGE DISTANCE L | EDGE DISTANCE R | EDGE DISTANCE TOTAL | ABANDONED DISTANCE L | ABANDONED DISTANCE R | ABANDONED DISTANCE TOTAL |
|---|---|---|---|---|---|---|---|---|---|---|---|
| 1 | A,D | NO | 3 | ①2<4 | 3,4,2,X | AD=1,2 | 1,2 | 2,4 | | | |
| 2 | A,B | – | | 2,2,4 | X,X,7,X | AB=2 | 1 | 3 | | | |
| 3 | D,F | YES | 4 | 2,2,4 | X,X,1,4 | DF=1,4 | 1,4 | 2,8 | AD+BD=1,4+1,4 | 1,4+1,4 | 5,2 |
| 4 | B,D | NO | | 5 | 1,3,2,7,6 | | | | | | |
| 5 | F,L | NO | | 3,3 | 11,X,9,3 | | | | | | |
| 6 | B,E | NO | | 4,5 | 10,8,X,2,7 | | | | | | |
| 7 | B,C | YES | 6 | ①3<4 | 2,X,X,X | BC=1 | 1 | 2 | | | |
| 8 | C,E | NO | | 3 | 6,16,7 | | | | | | |
| 9 | F,G | NO | | 3,4 | X,11,3,5 | | | | | | |
| 10 | G,J | NO | | 4 | 9,11,12,13 | | | | | | |
| 11 | G,I | YES | 3 | 2,2,4 | 9,X,X,X,5 | GI=1,4 | 1 | 2,4 | | | |
| 12 | I,I | NO | | 4 | 10,15,11,5 | | | | | | |
| 13 | J,L | YES | 2 | 2,3 | 10,12,X | JL=1,4 | 1,4 | 2,8 | GJ+IJ=1,4+1,4 | 1,4+1,4 | 5,6 |
| 14 | L,M | NO | | 2 | 13,15 | | | | | | |
| 15 | K,M | YES | 1 | 1 | 14 | | 1,4 | 1,4 | | | |
| 16 | E,H | YES | 5 | 2 | 6,8 | EH=1,4 | 1,4 | 2,8 | BE+CE=1,4+1,4 | 1,4+1,4 | 4,8 |

FIG. 17

17a GRAPH MANAGEMENT TABLE

| GVID | NET PAIR | CHOICE | SEQ NO. | DEGREE | ADJACENT VERTEX | EDGE DISTANCE L | EDGE DISTANCE R | EDGE DISTANCE TOTAL | ABANDONED DISTANCE L | ABANDONED DISTANCE R | ABANDONED DISTANCE TOTAL |
|---|---|---|---|---|---|---|---|---|---|---|---|
| 1 | A,D | NO | | 3 | 3,4,2 | AD=1,3 | 1 | 2.4 | | | |
| 2 | A,B | NO | | 1,2<4 | | AB=X | | | | | |
| 3 | D,F | YES | 4 | 2<4 | | DF=1,1 | 1,4 | 2.8 | AD+BD=1,4+1,4 | 1,4+1,4 | 5.2 |
| 4 | B,D | NO | | 5 | 1,3,2,7,6 | | | | | | |
| 5 | F,I | NO | | 3<4 | 11,X,9,3 | | | | | | |
| 6 | B,E | NO | | 4<5 | 16,8,X,2,7 | | | 2 | | | |
| 7 | B,C | YES | 6 | 3<4 | 2,X,6,4 | BC=1 | 1 | | | | |
| 8 | C,E | NO | | 3 | 8,16,7 | | | | | | |
| 9 | F,G | NO | | 3<4 | 9,11,12,13 | | | | | | |
| 10 | G,J | NO | | 4 | 9,11,12,13 | | | | | | |
| 11 | G,I | YES | 3 | 2<4 | 9,X,X,5 | GI=1,1 | 1 | 2.4 | | | |
| 12 | J,J | NO | | 4 | 10,13,14,5 | | | | | | |
| 13 | J,L | YES | 2 | 2<3 | 10,12,X | JL=1,4 | 1,4 | 2.8 | GJ+JL=2,1,4 | 1,4+1 | 5.8 |
| 14 | L,M | NO | | 2 | 13,15 | | | | | | |
| 15 | K,M | YES | 1 | 1 | 14 | | | | | | |
| 16 | E,H | YES | 5 | 2 | 6,8 | EH=1,4 | 1,4 | 2.8 | BE+CE=1+2,1,4 | 1,4+1 | 4.8 |

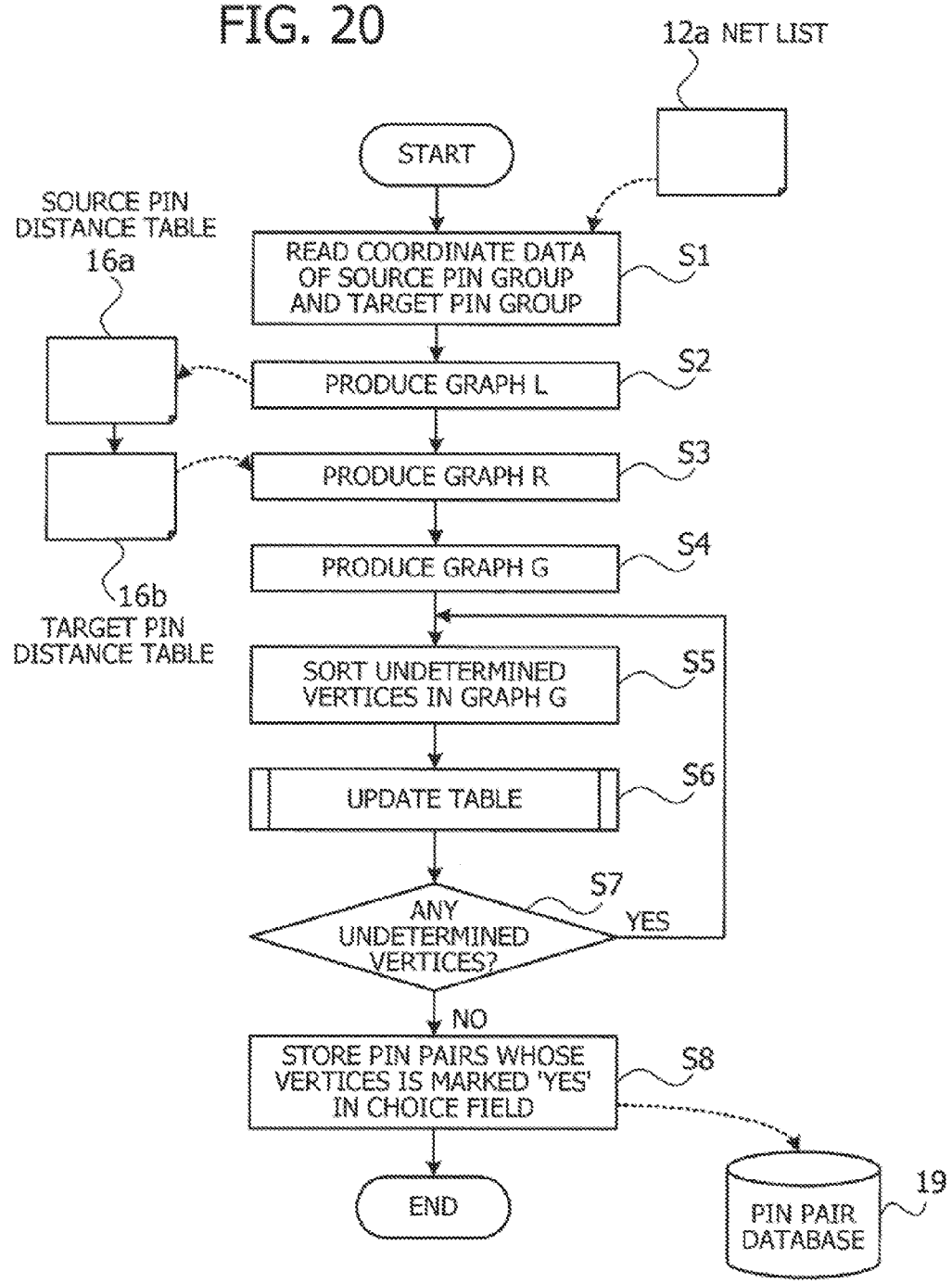

FIG. 22

12b NET LIST

| PIN ID | PIN GROUP ID | NET | COORDI-NATES | SIGNAL CATEGORY ID | PAIR PIN ID |
|---|---|---|---|---|---|
| 1 | L | A | (1,1) | 1 | |
| 2 | L | B | (1,3) | 1 | |
| 3 | L | C | (1,4) | 1 | |
| 4 | L | D | (2,2) | 1 | |
| 5 | L | E | (2,3) | 1 | |
| 6 | L | F | (3,1) | 1 | |
| 7 | L | G | (3,2) | 1 | |
| 8 | L | H | (3,4) | 1 | |
| 9 | L | I | (4,1) | 2 | |
| 10 | L | J | (5,2) | 2 | |
| 11 | L | K | (5,3) | 2 | |
| 12 | L | L | (6,1) | 2 | |
| 13 | L | M | (6,2) | 2 | |
| 14 | R | A | (10,3) | 1 | |
| 15 | R | B | (9,3) | 1 | |
| 16 | R | C | (9,4) | 1 | |
| 17 | R | D | (10,2) | 1 | |
| 18 | R | E | (8,4) | 1 | |
| 19 | R | F | (9,1) | 1 | |
| 20 | R | G | (8,1) | 1 | |
| 21 | R | H | (7,3) | 1 | |
| 22 | R | I | (8,2) | 2 | |
| 23 | R | J | (7,2) | 2 | |
| 24 | R | K | (5,4) | 2 | |
| 25 | R | L | (6,3) | 2 | |
| 26 | R | M | (6,4) | 2 | |

FIG. 26

12c NET LIST

| PIN ID | PIN GROUP ID | NET | COORDI-NATES | SIGNAL CATEGORY ID | PAIR PIN ID |
|---|---|---|---|---|---|
| 1 | L | A | (1,1) | 1 | |
| 2 | L | B | (1,3) | 1 | |
| 3 | L | C | (1,4) | 1 | |
| 4 | L | D | (2,2) | 1 | |
| 5 | L | E | (2,3) | 3 | |
| 6 | L | F | (3,1) | 1 | |
| 7 | L | G | (3,2) | 1 | |
| 8 | L | H | (3,4) | 3 | |
| 9 | L | I | (4,1) | 2 | |
| 10 | L | J | (5,2) | 2 | |
| 11 | L | K | (5,3) | 2 | |
| 12 | L | L | (6,1) | 2 | |
| 13 | L | M | (6,2) | 2 | |
| 14 | R | A | (10,3) | 1 | |
| 15 | R | B | (9,3) | 1 | |
| 16 | R | C | (9,4) | 1 | |
| 17 | R | D | (10,2) | 1 | |
| 18 | R | E | (8,4) | 3 | |
| 19 | R | F | (9,1) | 1 | |
| 20 | R | G | (8,1) | 1 | |
| 21 | R | H | (7,3) | 3 | |
| 22 | R | I | (8,2) | 2 | |
| 23 | R | J | (7,2) | 2 | |
| 24 | R | K | (5,4) | 2 | |
| 25 | R | L | (6,3) | 2 | |
| 26 | R | M | (6,4) | 2 | |

FIG. 27

20a DISTANCE COEFFICIENT TABLE

| SIGNAL CATEGORY ID (a) | SIGNAL CATEGORY ID (b) | DISTANCE COEFFICIENT |
|---|---|---|
| 1 | 1 | 1 |
| 1 | 2 | 3 |
| 1 | 3 | 3 |
| 2 | 2 | 1 |
| 2 | 3 | 3 |
| 3 | 3 | 1 |

FIG. 28

16c SOURCE PIN DISTANCE TABLE

PIN ID (NET)

| PIN ID (NET) | 1(A) | 2(B) | 3(C) | 4(D) | 5(E) | 6(F) | 7(G) | 8(H) | 9(I) | 10(J) | 11(K) | 12(L) | 13(M) |
|---|---|---|---|---|---|---|---|---|---|---|---|---|---|
| 1(A) | - | >2 | >2 | 1.4 | >2 | >2 | >2 | >2 | >2 | >2 | >2 | >2 | >2 |
| 2(B) | - | - | 1 | 1.4 | (1*3)>2 | >2 | >2 | >2 | >2 | >2 | >2 | >2 | >2 |
| 3(C) | - | - | - | 1.4 | (1.4*3)>2 | >2 | >2 | >2 | >2 | >2 | >2 | >2 | >2 |
| 4(D) | - | - | - | - | (1*3)>2 | >2 | >2 | (2*3)>2 | >2 | >2 | >2 | >2 | >2 |
| 5(E) | - | - | - | - | - | 1.4 | 1 | 1.4 | >2 | >2 | >2 | >2 | >2 |
| 6(F) | - | - | - | - | - | - | (1.4*3)>2 | >2 | >2 | >2 | >2 | >2 | >2 |
| 7(G) | - | - | - | - | - | - | - | (2*3)>2 | (1*3)>2 | >2 | >2 | >2 | >2 |
| 8(H) | - | - | - | - | - | - | - | - | (1.4*3)>2 | (2*3)>2 | >2 | >2 | >2 |
| 9(I) | - | - | - | - | - | - | - | - | - | >2 | >2 | >2 | >2 |
| 10(J) | - | - | - | - | - | - | - | - | - | - | 1 | 1.4 | 1 |
| 11(K) | - | - | - | - | - | - | - | - | - | - | - | 1.4 | 1 |
| 12(L) | - | - | - | - | - | - | - | - | - | - | - | - | >2 |
| 13(M) | - | - | - | - | - | - | - | - | - | - | - | - | - |

FIG. 29

16d TARGET PIN DISTANCE TABLE

| PIN ID (NET) | 14(A) | 15(B) | 16(C) | 17(D) | 18(E) | 19(F) | 20(G) | 21(H) | 22(I) | 23(J) | 24(K) | 25(L) | 26(M) |
|---|---|---|---|---|---|---|---|---|---|---|---|---|---|
| 14(A) | - | 1 | 1.4 | 1 | >2 | 2 | >2 | >2 | >2 | >2 | >2 | >2 | >2 |
| 15(B) |   | - | 1 | 1.4 | >2 | >2 | >2 | >2 | >2 | >2 | >2 | >2 | >2 |
| 16(C) |   |   | - | >2 | (1.4*3)>2 | >2 | >2 | (2*3)>2 | >2 | >2 | >2 | >2 | (2*3)>2 |
| 17(D) |   |   |   | - | (1*3)>2 | >2 | >2 | >2 | >2 | >2 | >2 | >2 | >2 |
| 18(E) |   |   |   |   | - | 1.4 | >2 | 1.4 | (2*3)>2 | >2 | >2 | >2 | (2*3)>2 |
| 19(F) |   |   |   |   |   | - | 1 | >2 | (1.4*3)>2 | >2 | >2 | >2 | >2 |
| 20(G) |   |   |   |   |   |   | - | 1 | (1*3)>2 | >2 | >2 | >2 | >2 |
| 21(H) |   |   |   |   |   |   |   | - | (1.4*3)>2 | >2 | >2 | >2 | (1.4*3)>2 |
| 22(I) |   |   |   |   |   |   |   |   | - | (1*3)>2 | >2 | >2 | (1*3)>2 |
| 23(J) |   |   |   |   |   |   |   |   |   | - | >2 | (1*3)>2 | (1.4*3)>2 |
| 24(K) |   |   |   |   |   |   |   |   |   |   | - | 1.4 | 1 |
| 25(L) |   |   |   |   |   |   |   |   |   |   |   | - | 1 |
| 26(M) |   |   |   |   |   |   |   |   |   |   |   |   | - |

FIG. 33
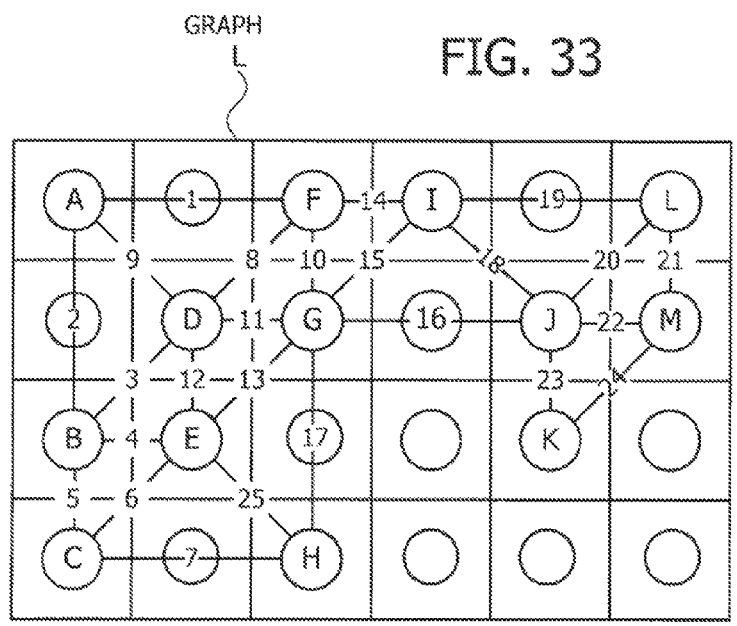
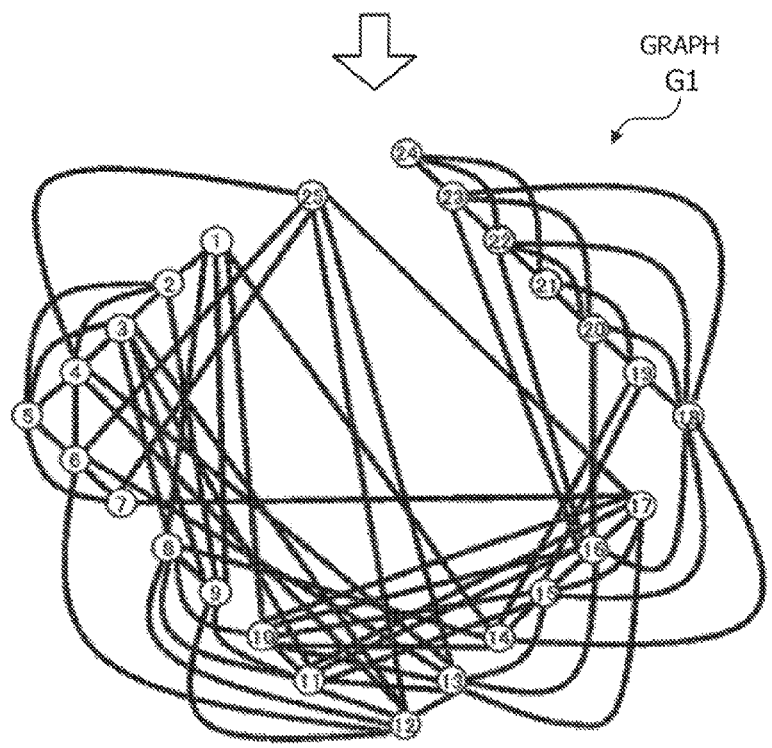

FIG. 34

GRAPH MANAGEMENT TABLE 17b

| GVID | NET PAIR | CHOICE | SEQ NO. | DEGREE | ADJACENT VERTEX | | | | | | | | | EDGE DISTANCE | ABANDONED DISTANCE |
|---|---|---|---|---|---|---|---|---|---|---|---|---|---|---|---|
| 1 | A,F | -- | | 5 | 2 | 9 | 8 | 10 | 14 | | | | | | |
| 2 | A,B | -- | | 5 | 9 | 1 | 5 | 4 | 3 | | | | | | |
| 3 | B,D | -- | | 7 | 2 | 5 | 4 | 12 | 11 | 8 | 9 | | | | |
| 4 | B,E | -- | | 7 | 3 | 2 | 5 | 12 | 13 | 25 | 6 | | | | |
| 5 | B,C | -- | | 5 | 2 | 3 | 4 | 6 | 7 | | | | | | |
| 6 | C,E | -- | | 6 | 5 | 7 | 4 | 12 | 13 | 25 | | | | | |
| 7 | C,H | -- | | 4 | 5 | 6 | 25 | 17 | | | | | | | |
| 8 | D,F | -- | | 7 | 9 | 3 | 12 | 11 | 10 | 14 | 1 | | | | |
| 9 | A,D | -- | | 6 | 1 | 2 | 8 | 11 | 12 | 3 | | | | | |
| 10 | F,G | -- | | 8 | 8 | 1 | 14 | 11 | 13 | 17 | 16 | 15 | | | |
| 11 | D,G | -- | | 9 | 12 | 3 | 9 | 8 | 10 | 15 | 16 | 17 | 13 | | |
| 12 | D,E | -- | | 8 | 3 | 9 | 8 | 11 | 4 | 6 | 25 | 13 | | | |
| 13 | E,G | -- | | 9 | 25 | 6 | 4 | 12 | 11 | 10 | 15 | 16 | 17 | | |
| 14 | F,I | -- | | 6 | 1 | 8 | 10 | 15 | 18 | 19 | | | | | |
| 15 | G,I | -- | | 8 | 10 | 11 | 13 | 17 | 16 | 14 | 19 | 18 | | | |
| 16 | G,J | -- | | 9 | 15 | 10 | 13 | 11 | 17 | 18 | 20 | 22 | 23 | | |
| 17 | G,H | -- | | 7 | 7 | 25 | 16 | 15 | 10 | 11 | 13 | | | | |
| 18 | I,J | -- | | 7 | 16 | 23 | 22 | 20 | 15 | 14 | 19 | | | | |
| 19 | I,L | -- | | 5 | 14 | 15 | 18 | 20 | 21 | | | | | | |
| 20 | J,L | -- | | 6 | 18 | 16 | 23 | 22 | 21 | 19 | | | | | |
| 21 | L,M | -- | | 4 | 19 | 20 | 22 | 24 | | | | | | | |
| 22 | J,M | -- | | 6 | 20 | 18 | 16 | 23 | 24 | 21 | | | | | |
| 23 | J,K | -- | | 5 | 16 | 18 | 20 | 22 | 24 | | | | | | |
| 24 | K,M | -- | | 3 | 22 | 21 | 23 | | | | | | | | |
| 25 | E,H | -- | | 6 | 13 | 12 | 4 | 6 | 17 | 7 | | | | | |

FIG. 35

GRAPH MANAGEMENT TABLE 17b

| GVID | NET PAIR | CHOICE | SEQ NO. | DEGREE | ADJACENT VERTEX | | | | | | | | | EDGE DISTANCE | ABANDONED DISTANCE |
|---|---|---|---|---|---|---|---|---|---|---|---|---|---|---|---|
| 1 | A,F | -- | | 5 | 2 | 9 | 8 | 10 | 14 | | | | | | |
| 2 | A,B | -- | | 5 | 9 | 1 | 5 | 4 | 3 | | | | | | |
| 3 | B,D | -- | | 7 | 2 | 2 | 4 | 12 | 11 | 8 | 9 | | | | |
| 4 | B,E | -- | | 7 | 3 | 5 | 2 | 5 | 12 | 13 | 6 | | | | |
| 5 | B,C | -- | | 5 | 2 | 3 | 4 | 6 | 7 | | | | | | |
| 6 | C,E | -- | | 6 | 5 | 7 | 4 | 12 | 13 | 25 | | | | | |
| 7 | C,H | -- | | 4 | 6 | 25 | 17 | 25 | | | | | | | |
| 8 | D,F | -- | | 7 | 9 | 3 | 12 | 11 | 10 | 14 | 1 | | | | |
| 9 | A,D | -- | | 6 | 1 | 2 | 8 | 11 | 12 | 3 | | | | | |
| 10 | F,G | -- | | 8 | 8 | 1 | 14 | 11 | 13 | 17 | 16 | 15 | | | |
| 11 | D,G | -- | | 9 | 12 | 3 | 9 | 8 | 10 | 15 | 16 | 17 | 13 | | |
| 12 | D,E | -- | | 8 | 3 | 9 | 8 | 11 | 4 | 6 | 25 | 13 | | | |
| 13 | E,G | -- | | 9 | 25 | 6 | 4 | 12 | 11 | 10 | 15 | 16 | 17 | | |
| 14 | F,I | -- | | 6 | 1 | 8 | 10 | 15 | 18 | 19 | | | | | |
| 15 | G,I | -- | | 8 | 10 | 11 | 13 | 17 | 16 | 14 | 19 | 18 | | | |
| 16 | G,J | -- | | 9 | 15 | 10 | 13 | 11 | 18 | 17 | 20 | 22 | 23 | | |
| 17 | G,H | -- | | 7 | 7 | 25 | 16 | 15 | 10 | 11 | 13 | | | | |
| 18 | I,J | -- | | 7 | 16 | 23 | 22 | 20 | 18 | 14 | 19 | | | | |
| 19 | J,L | -- | | 5 | 14 | 15 | 18 | 20 | 21 | | | | | | |
| 20 | J,L | -- | | 6 | 18 | 16 | 23 | 22 | 21 | 19 | | | | | |
| 21 | L,M | | | 4 | 19 | 20 | 24 | 22 | | | | | | | |
| 22 | J,M | | | 6 | 20 | 18 | 16 | 23 | 22 | 24 | | | | | |
| 23 | J,K | | | 5 | 16 | 18 | 20 | 22 | 24 | | | | | | |
| 24 | K,M | YES | 1 | 3 | 22 | 21 | 23 | | | | | | | | |
| 25 | E,H | -- | | 6 | 13 | 12 | 4 | 6 | 17 | 7 | | | | | |

FIG. 36

GRAPH MANAGEMENT TABLE 17b

| GVID | NET PAIR | CHOICE | SEQ NO. | DEGREE | ADJACENT VERTEX | | | | | | | | | EDGE DISTANCE | ABANDONED DISTANCE |
|---|---|---|---|---|---|---|---|---|---|---|---|---|---|---|---|
| 1 | A,F | – | | 5 | 2 | 9 | 8 | 10 | 14 | | | | | | |
| 2 | A,B | – | | 5 | 9 | 1 | 5 | 4 | 3 | | | | | | |
| 3 | B,D | – | | 7 | 2 | 5 | 4 | 12 | 11 | 8 | 9 | | | | |
| 4 | B,E | – | | 7 | 3 | 2 | 5 | 12 | 13 | 25 | 6 | | | | |
| 5 | B,C | – | | 5 | 2 | 3 | 4 | 6 | 7 | | | | | | |
| 6 | C,E | – | | 6 | 5 | 7 | 4 | 12 | 13 | 25 | | | | | |
| 7 | C,H | – | | 4 | 6 | 25 | 17 | | | | | | | | |
| 8 | D,F | – | | 7 | 9 | 3 | 12 | 11 | 10 | 14 | 1 | | | | |
| 9 | A,D | – | | 6 | 1 | 2 | 8 | 11 | 12 | 3 | | | | | |
| 10 | F,G | – | | 8 | 8 | 1 | 14 | 11 | 13 | 17 | 16 | 15 | | | |
| 11 | D,G | – | | 9 | 12 | 3 | 9 | 8 | 10 | 15 | 16 | 17 | 13 | | |
| 12 | D,E | – | | 8 | 3 | 9 | 8 | 11 | 4 | 6 | 25 | 13 | | | |
| 13 | E,G | – | | 9 | 25 | 6 | 4 | 12 | 11 | 10 | 15 | 16 | 17 | | |
| 14 | F,I | – | | 6 | 1 | 8 | 10 | 15 | 18 | 19 | | | | | |
| 15 | G,I | – | | 8 | 10 | 11 | 13 | 17 | 16 | 14 | 19 | 18 | | | |
| 16 | G,J | – | | 7<9 | 15 | 10 | 11 | 13 | 17 | 18 | 20 | | | | |
| 17 | G,H | – | | 7 | 7 | 25 | 16 | 15 | 10 | 11 | 13 | | | | |
| 18 | I,J | – | | 5<7 | 16 | 23 | 22 | 20 | 15 | 14 | 19 | | | | |
| 19 | I,L | – | | 4<5 | 14 | 15 | 18 | 20 | 19 | | | | | | |
| 20 | J,L | – | | ③<6 | 18 | 16 | 20 | 22 | 23 | 19 | | | | | |
| 21 | L,M | NO | | 4 | 20 | 19 | 23 | 24 | | | | | | | |
| 22 | J,M | NO | | 6 | 20 | 18 | 16 | 23 | 24 | 21 | | | | | |
| 23 | J,K | NO | | 5 | 16 | 20 | 18 | 22 | 24 | | | | | | |
| 24 | K,M | YES | 1 | 3 | 22 | 21 | 23 | | | | | | | | |
| 25 | E,H | – | | 6 | 13 | 12 | 4 | 6 | 17 | 7 | | | | | |

GRAPH MANAGEMENT TABLE 17b

FIG. 38

| GVID | CHOICE | SEQ NO. | DEGREE | ADJACENT VERTEX | | | | | | | EDGE DISTANCE | ABANDONED DISTANCE |
|---|---|---|---|---|---|---|---|---|---|---|---|---|
| 1 | | | | | | | | | | | | |
| 2 | NO | | 4<5 | 9 | 1 | 5 | 4 | 12 | | | 2 | |
| 3 | — | | 6<7 | 2 | 5 | 4 | 12 | 11 | 8 | 9 | | |
| 4 | — | | 7 | 3 | 2 | 5 | 12 | 13 | 25 | 6 | | |
| 5 | — | | 5 | 2 | 3 | 4 | 6 | 7 | | | | |
| 6 | — | | 6 | 5 | 7 | 4 | 12 | 13 | 25 | | | |
| 7 | — | | 4 | | 6 | 25 | 17 | | | | 2 | |
| 8 | NO | | 7 | 9 | 3 | 12 | 11 | 10 | 14 | 1 | | |
| 9 | YES | 4 | 4<6 | 1 | 2 | 8 | 11 | 12 | 3 | | (1,4) | |
| 10 | NO | | X<8 | 8 | 14 | 11 | 13 | 19 | 15 | 17 | | |
| 11 | — | | 5<8<9 | 12 | 3 | 9 | 8 | 10 | 15 | 16 | | |
| 12 | — | | 7<8 | 3 | 9 | 8 | 11 | 4 | 6 | 25 | | |
| 13 | — | | 6<8<9 | 25 | 7 | 4 | 12 | 11 | 10 | 15 | | |
| 14 | YES | 3 | 4<8 | 7 | 8 | 16 | 25 | 13 | 10 | 16 | 1 | |
| 15 | NO | | 5<7 | 16 | 23 | 22 | 18 | 19 | 14 | 17 | | |
| 16 | NO | | 4<5 | 14 | 15 | 18 | 25 | 17 | | 13 | | |
| 17 | — | | 3<6 | 15 | 10 | 14 | 13 | 16 | 25 | 18 | | |
| 18 | NO | | 4 | 19 | 16 | 22 | 15 | 20 | 17 | 22 | | |
| 19 | NO | | 6 | 20 | 18 | 22 | 20 | 14 | 24 | 23 | | |
| 20 | YES | 2 | 5 | 16 | 18 | 15 | 22 | 19 | 13 | | 2 | |
| 21 | NO | | 3 | 22 | 21 | | | | | | | |
| 22 | NO | | 4<6<7 | 13 | 12 | 6 | 17 | 24 | 7 | | | |
| 23 | NO | | 6 | | | | | | | | | |
| 24 | YES | 1 | | | | | | | | | | |
| 25 | — | | | | | | | | | | | |

GRAPH MANAGEMENT TABLE 17b

FIG. 39

GRAPH MANAGEMENT TABLE 17b

| GVID | CHOICE | SEQ NO. | DEGREE | ADJACENT VERTEX | | | | | | | EDGE DISTANCE | ABANDONED DISTANCE |
|---|---|---|---|---|---|---|---|---|---|---|---|---|
| 1 | NO | | 5 | | | | | | | | | |
| 2 | NO | | 4<5 | 9 | 9 | 8 | 10 | 14 | | | 2 | |
| 3 | NO | | 6<7 | 2 | 1 | 5 | 4 | 3 | 11 | | | |
| 4 | — | | 4<7 | 3 | 5 | 4 | 12 | 13 | 25 | 6 | ① | |
| 5 | YES | 5 | ③<5 | 2 | 3 | 4 | 6 | 13 | | | | |
| 6 | — | | 5<6 | 5 | 4 | 6 | 12 | 25 | 7 | | | |
| 7 | — | | 4 | 5 | 6 | 25 | 17 | | | | 2 | |
| 8 | NO | | 4<7 | 8 | 3 | 2 | 5 | 10 | 14 | 1 | | |
| 9 | YES | 4 | 4<6 | 1 | 2 | 8 | 11 | 12 | 14 | 3 | 16 | 15 | 14 |
| 10 | NO | | 7<8 | 8 | 4 | 1 | 13 | 17 | 3 | 16 | 18 | 17 | |
| 11 | NO | | 5<6<9 | 12 | 3 | 9 | 2 | 14 | 15 | 17 | 16 | 13 | |
| 12 | NO | | 7<8 | 3 | 2 | 4 | 8 | 11 | 9 | 6 | 16 | | |
| 13 | — | | 4<6<8<9 | 25 | 6 | 4 | 25 | 7 | 16 | 10 | 15 | 17 | 1 |
| 14 | YES | 3 | 4<6 | 1 | 8 | 10 | 13 | 15 | 17 | 18 | 19 | 2 | |
| 15 | NO | | 5<8 | 10 | 11 | 13 | 14 | 16 | 17 | 18 | 19 | 22 | |
| 16 | NO | | 7<8 | 15 | 17 | 20 | 21 | 18 | 19 | 22 | | | |
| 17 | — | | 4<6<7 | 10 | 13 | 16 | 11 | 15 | 14 | 20 | 22 | | |
| 18 | NO | | 5<8 | 9 | 14 | 15 | 16 | 17 | 19 | 20 | 22 | 23 | |
| 19 | NO | | 4<5 | 16 | 18 | 20 | 21 | | | | | | |
| 20 | YES | 2 | 3<6 | 16 | 18 | 19 | 21 | 22 | 23 | | | | |
| 21 | NO | | 6 | 20 | 18 | 22 | 23 | 24 | 19 | | | | |
| 22 | NO | | 5 | 16 | 17 | 20 | 18 | 23 | | | | | |
| 23 | NO | | 2 | 22 | 21 | 24 | | | | | | | |
| 24 | YES | 1 | ③<4<6<7 | 13 | 12 | 4 | 6 | 17 | | | | | |
| 25 | — | | 5<6 | | | | | | | | | | |

FIG. 40

GRAPH MANAGEMENT TABLE 17b

| GVID | CHOICE | SEQ NO. | DEGREE | ADJACENT VERTEX | | | | | | EDGE DISTANCE | ABANDONED DISTANCE |
|---|---|---|---|---|---|---|---|---|---|---|---|
| 1 | NO | | 5 | 12 | 9 | 8 | 10 | 14 | | | |
| 2 | NO | | 4,5 | 10 | 1 | 5 | 12 | 11 | | 2 | |
| 3 | NO | | 6,7 | 2 | 5 | 4 | 12 | 25 | 8,9 | 1 | |
| 4 | NO | | 4,7 | 3 | 12 | 5 | 4 | 16 | 6 | | |
| 5 | YES | 5 | 3<5 | 5 | 7 | 4 | 12 | 25 | | 2 | |
| 6 | NO | | 5,6 | 15 | 6 | 25 | 3 | 12 | 17 | | |
| 7 | NO | | 4 | 9 | 3 | 12 | 11 | 10 | 14 | 1 | |
| 8 | NO | | 7 | 2 | 4 | 1 | 14 | 12 | 3 | | |
| 9 | YES | 4 | 4<9 | 8 | 2 | 14 | 13 | 17 | 15 | | |
| 10 | NO | | 7,8 | 12 | 3 | 9 | 11 | 16 | 15 | | |
| 11 | NO | | 5<8<9 | 13 | 2 | 14 | 4 | 1 | 16 | 2 | |
| 12 | NO | | 7,8 | 9 | 1 | 8 | 14 | 3 | 13 | | |
| 13 | — | | ②<4<6<8<⑨ | 25 | 6 | 4 | 12 | 11 | 10 | 17 15 18 | EH+GH=3,4 1,4 |
| 14 | YES | 3 | 4<6 | 1 | 8 | 2 | 15 | 19 | 11 | | |
| 15 | NO | | 5<8 | 10 | 11 | 19 | 18 | 14 | 16 | 2 | |
| 16 | NO | | 7,8 | 15 | 10 | 13 | 17 | 11 | 13 | | |
| 17 | — | | 7<9 | 13 | 16 | 15 | 18 | 22 | 23 | | |
| 18 | NO | | 5<7 | 16 | 23 | 15 | 22 | 20 | 17 | 2 | |
| 19 | NO | | 4,5 | 14 | 15 | 21 | 20 | 22 | | | |
| 20 | YES | 2 | 3<6 | 18 | 19 | 22 | 21 | 23 | 19 | | |
| 21 | NO | | 4 | 19 | 20 | 22 | 24 | | | | |
| 22 | NO | | 5 | 20 | 18 | 21 | 24 | 23 | | | |
| 23 | NO | | 3 | 18 | 22 | 20 | | | | | |
| 24 | YES | 1 | 3 | 22 | 21 | 23 | | | | | |
| 25 | YES | | ②<5<⑥ | 13 | 6 | 4 | 5 | 17 | | 1,4 | EG+GH=3,4 |

FIG. 41

GRAPH MANAGEMENT TABLE 17b

| GVID | CHOICE | SEQ NO. | DEGREE | ADJACENT VERTEX | | | | | | EDGE DISTANCE | ABANDONED DISTANCE |
|---|---|---|---|---|---|---|---|---|---|---|---|
| 1 | NO | | 5 | 2 | 9 | 8 | 10 | 14 | | | |
| 2 | NO | | 4:5 | 9 | 1 | 5 | 4 | 3 | | 3 | |
| 3 | NO | | 5:7 | 12 | 5 | 4 | 11 | 8 | 9 | | |
| 4 | NO | | 4:7 | 3 | 2 | 5 | 12 | 13 | 6 | | |
| 5 | YES | 5 | 3:5 | 2 | 3 | 4 | 6 | | | 1 | |
| 6 | NO | | 5:6 | 5 | 7 | 16 | 13 | 22 | 23 | | |
| 7 | NO | | 4 | 6 | 3 | 10 | 14 | | | 2 | |
| 8 | NO | | 7 | 9 | 1 | 12 | 11 | 6 | 3 | | |
| 9 | YES | 4 | 4:6 | 1 | 2 | 8 | 10 | 11 | 12 | | |
| 10 | NO | | 7:8 | 12 | 8 | 9 | 14 | 11 | 4 | 3 | |
| 11 | NO | | 5:8:9 | 13 | 3 | 10 | 17 | 16 | 15 | | |
| 12 | NO | | 7:8 | 25 | 8 | 6 | 4 | 10 | 13 | | |
| 13 | NO | | 2:4:6:8:9 | 25 | 6 | 11 | 4 | 12 | 10 | | |
| 14 | YES | 3 | 4:6 | 1 | 8 | 10 | 19 | 18 | 16 | | |
| 15 | NO | | 5:7 | 16 | 11 | 14 | 19 | 18 | 17 | | |
| 16 | NO | | 5:8 | 14 | 22 | 20 | 15 | 13 | 17 | | |
| 17 | NO | | 7:8:9 | 18 | 23 | 16 | 15 | 13 | 11 | 1,4 | EH+GH=3,4 |
| 18 | NO | | 5:7 | 16 | 14 | 15 | 17 | 23 | 22 | 2 | |
| 19 | NO | | 4:5 | 20 | 21 | 22 | 14 | | | | |
| 20 | YES | 2 | 3:6 | 18 | 19 | 24 | 21 | 22 | 16 | 2 | |
| 21 | NO | | 4 | 24 | 23 | 19 | 20 | | | | |
| 22 | NO | | 6 | 19 | 18 | 16 | 20 | | | | |
| 23 | NO | | 5 | 17 | 18 | 21 | 24 | | | | |
| 24 | YES | 1 | 3 | 23 | 25 | 21 | | | | | |
| 25 | YES | 6 | 2:5:6 | 13 | 12 | 4 | 6 | 7 | 17 | 1,4 | EG+GH=3,4 |

APPARATUS AND METHOD FOR AIDING IN DESIGNING ELECTRONIC CIRCUITS

CROSS-REFERENCE TO RELATED APPLICATION

This application is based upon and claims the benefit of priority of the prior Japanese Patent Application No. 2011-165342, filed on Jul. 28, 2011, the entire contents of which are incorporated herein by reference.

FIELD

The embodiments discussed herein relate to an apparatus and method for aiding in designing electronic circuits.

BACKGROUND

Ball grid array (BGA) is a type of surface-mount packages used for integrated circuits with a high pin density. Wiring patterns are routed between BGA devices to provide signal connections including buses. One proposed routing algorithm determines bus connection paths by seeking a route of each single net (logical connection) such that all the nets constituting a bus will escape out of the boundaries of the components (e.g., BGA devices). Another routing algorithm bundles two or more nets into a single virtual net that is as wide as the sum of individual wire widths. The proposed algorithm routes this virtual net as a single trace, and then splits it back to the original bundle of nets. See, for example, Japanese Laid-open Patent Publication No. 2002-217302. See also Lijuan Luo et al., "B-Escape: A Simultaneous Escape Routing Algorithm Based on Boundary Routing," Proceedings of the 10th International Symposium on Physical Design, San Francisco, Calif. USA, 2010, pp. 19-25.

When the pin density of devices is high, there would be a number of possible combinations of pins even in a small area. This means that a virtual net may be composed in various ways. It is, therefore, not easy to determine which pins (or which nets) to combine into one bus for routing.

SUMMARY

According to an aspect of the embodiments discussed in this specification, there is provided a circuit design aiding apparatus including a processor and a memory. The memory is configured to store information about first and second pin groups to be wired to each other, the information including logical connection data that associates pins in the first pin group with pins in the second pin group. The processor is configured to perform a procedure including: selecting a set of pair candidates each specifying a first pair of pins in the first pin group and a second pair of pins in the second pin group which are associated with each other in the logical connection data and whose respective distances are within a specified range, and determining which pins in the first and second pin groups are to be wired in pairs, based on the selected set of pair candidates.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 depicts an example of data stored in a pin coordinate database;

FIGS. 6 and 7 are diagrams used to explain processing of a pair candidate graph generation unit;

FIG. 9 illustrates an exemplary graph produced by a pair determination unit;

FIG. 10 illustrates a graph management table;

FIGS. 11 to 17 illustrate operation of the pair determination unit;

FIG. 20 is a flowchart of a process executed by a pair candidate graph generation unit and a pair determination unit according to the second embodiment;

FIG. 22 illustrates a net list according to a third embodiment;

FIG. 26 illustrates a net list according to the fourth embodiment;

FIG. 27 illustrates data stored in a category-specific distance coefficient database;

FIG. 28 illustrates a source pin distance table according to the fourth embodiment;

FIG. 29 illustrates a target pin distance table according to the fourth embodiment;

FIG. 33 illustrates a process executed by a pair candidate graph generation unit according to the fifth embodiment;

FIG. 34 illustrates a graph management table according to the fifth embodiment;

FIGS. 35 to 41 illustrate operation of a pair determination unit according to the fifth embodiment;

DESCRIPTION OF EMBODIMENTS

Figure 1:
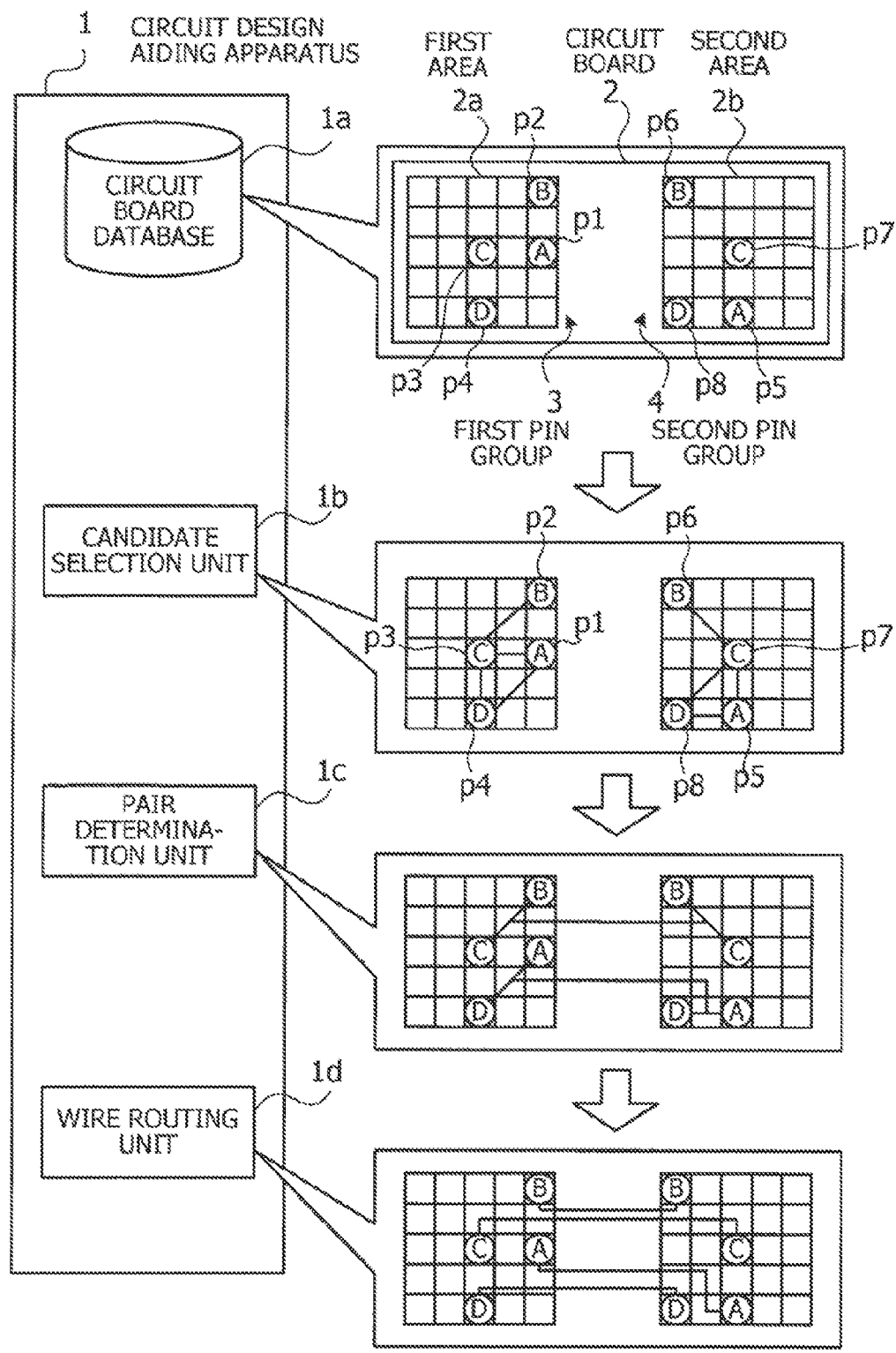
FIG. 1 illustrates a circuit design aiding apparatus according to a first embodiment.

Several embodiments of a circuit design aiding apparatus will be described in detail below with reference to the accompanying drawings, wherein like reference numerals refer to like elements throughout. The description begins with a first embodiment to present an overview of the proposed circuit design aiding apparatus, and then proceeds to a second and subsequent embodiments to discuss more specific implementations of the same.

(a) First Embodiment

FIG. 1 illustrates a circuit design aiding apparatus according to a first embodiment. The illustrated circuit design aiding apparatus (computer) 1 aids the user to perform wiring design for BGA devices and other components on a printed circuit board (PCB) or the like. According to the first embodiment, this circuit design aiding apparatus 1 includes a circuit board database 1a, a candidate selection unit 1b, a pair determination unit 1c, and a wire routing unit 1d. The circuit board database 1a may be located outside the circuit design aiding apparatus 1 as a variation of the illustrated embodiment.

The circuit board database 1a stores circuit board data that includes a listing of nets (logical connection data) connecting two sets of bus pins located in two separate areas on a layer of the circuit board. For illustrative purposes, the right half of FIG. 1 depicts a circuit board 2 representing an example of circuit board data in the circuit board database 1a. This circuit board has two areas 2a and 2b for BGA packages with a plurality of terminals. The term "pins" is used herein to refer to those terminals, while in fact the pins are replaced by balls of solder in the case of BGA. The first area 2a accommodates a first pin group 3 including pins p1, p2, p3, and p4 and a second pin group 4 including pins p5, p6, p7, and p8. The pins in the first pin group 3 are supposed to be connected to those in the second pin group 4. Each pair of connected pins belongs to a specific net, which is designated by the net name (e.g., character A, B, C, or D in FIG. 1). For example, "net A" refers to a net designated by the net name "A" and includes pin P1 in the first pin group 3 and pin p5 in the second pin group 4 which are to be connected together.

The candidate selection unit 1b measures the distance of each possible pair of pins in the first pin group 3, as well as that in the second pin group 4. Referring to the exemplary circuit board 2 of FIG. 1, the first and second areas 2a and 2b are each depicted as an array of square cells. The minimum distance between two aligned pins is referred to as one unit distance. For example, pins p1 and p2 in FIG. 1 have a minimum distance of 1. The candidate selection unit 1b selects pairs of pins out of both the first pin group 3 and the second pin group 4. The two pins constituting a pair have to be within a specified distance from each other. The candidate selection unit 1b designates such pairs as "pair candidates." In the present context of FIG. 1, a pair candidate is formed from two pins with a distance of 2 or less. Referring to the first pin group 3, pins p2 and p4 (or pin combination of net B and net D) are not qualified to be a pair candidate because their distance exceeds 2. Similarly, in the second pin group 4, pins p5 and p6 (or pin combination of net A and net B) is not qualified to be a pair candidate because their distance exceeds 2. By rejecting those disqualified pin combinations B-D and A-B, the candidate selection unit 1b nominates the remaining four pin combinations A-C, A-D, B-C, and C-D as a set of pair candidates. FIG. 1 indicates those pin combinations by placing a line segment between the pertinent pins.

Preferably, the candidate selection unit 1b may be configured to evaluate pin-to-pin distances in the second pin group 4 only for the nets whose corresponding pins in the first pin group 3 have been found to have a distance of 2 or less. This configuration effectively reduces the total number of pin-to-pin distances that the candidate selection unit 1b has to evaluate.

Out of the pair candidates selected by the candidate selection unit 1b, the pair determination unit 1c then determines which pins in the first pin group 3 and second pin group 4 are to be wired in pairs. Since the pins constituting a pair candidate are known to be within a specified distance, the pair determination unit 1c can choose appropriate pin pairs which would be wired with a reduced likelihood of allowing some other wires to intrude into them. As an example of unsuccessful pairs, pins p1 and p2 in the first pin group 3 might be combined as a pair candidate because of their short distance. Pins p3 and p4 may similarly be combined as a pair candidate for the same reason. The former pins p1 and p2 are then wired with their corresponding pins p5 and p6 via the shortest path. The same may be attempted for the latter pins p3 and p4 and their corresponding pins p7 and p8, but the resulting wires would cross the wires of the former pins p1 and p2. This means that the shortest-path routing is not possible in the example case.

Preferably, the pair determination unit 1c may give a higher priority to a pair candidate that has fewer adjacent pair candidates in either the first pin group 3 or second pin group 4. That is, some pins in the pair candidates may be less influential in choosing other pairs, and the pair determination unit 1c selects such pins in preference to others, thus increasing the chances of establishing pairs. In the example of FIG. 1, the combination of pins p2 and p3 is the only pair candidate that includes pin p2. It is thus preferable to choose this combination of pins p2 and p3 in the first place. Once a pin pair is established between net B and net C, then the remaining nets A and D form another pin pair as depicted in FIG. 1.

The wire routing unit 1d performs wire routing to connect the pins of each pin pair chosen by the pair determination unit 1c. Specifically, the wire routing unit 1d first routes a single virtual connection between a pin pair in the first area 2a and its corresponding pin pair in the second area 2b, and then produces individual wires of the routed virtual connection. The bottommost part of FIG. 1 illustrates an example of traces that the wire routing unit 1d has produced.

The above candidate selection unit 1b, pair determination unit 1c, and wire routing unit 1d in FIG. 1 may be implemented by using, for example, a central processing unit (CPU) in the circuit design aiding apparatus 1. The circuit board database 1a may be implemented by using, for example, a random access memory (RAM) or a hard disk drive (HDD) or other data storage devices in the circuit design aiding apparatus 1.

(b) Second Embodiment

Figure 2:
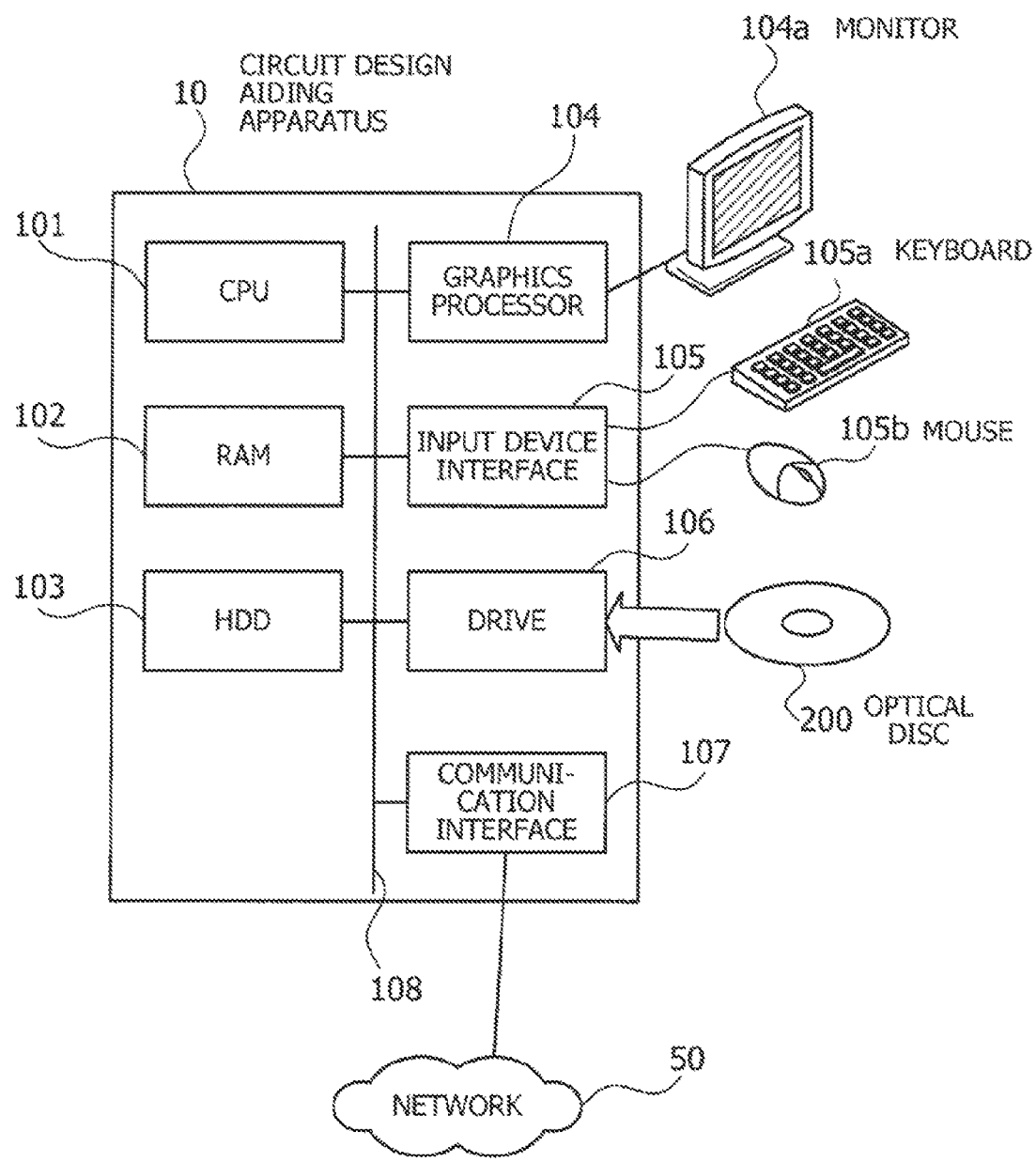
FIG. 2 illustrates a hardware configuration of a circuit design aiding apparatus according to a second embodiment.

FIG. 2 illustrates a hardware configuration of a circuit design aiding apparatus according to a second embodiment. The illustrated circuit design aiding apparatus 10 has a CPU 101 to control the entire system of the circuit design aiding apparatus 10. The CPU 101 is connected to a random access memory (RAM) 102 and other various devices and interfaces on a bus 108. The RAM 102 serves as primary storage of the circuit design aiding apparatus 10. Specifically, the RAM 102 is used to temporarily store the whole or part of operating system (OS) programs and application programs that the CPU 101 executes, in addition to other various data objects that it manipulates at runtime.

Other devices on the bus 108 are a hard disk drive (HDD) 103, a graphics processor 104, an input device interface 105, a drive 106, and a communication interface 107. The HDD 103 writes and reads data magnetically on its internal platters. The HDD 103 serves as secondary storage of the circuit design aiding apparatus 10 to store program and data files of the operating system and applications. Flash memory and other semiconductor memory devices may also be used as secondary storage, similarly to the HDD 103.

The graphics processor 104, coupled to a monitor 104a, produces video images in accordance with drawing commands from the CPU 101 and displays them on a screen of the monitor 104a. The monitor 104a may be, for example, a cathode ray tube (CRT) display or a liquid crystal display. The input device interface 105 is connected to input devices such as a keyboard 105a and a mouse 105b and supplies signals from those devices to the CPU 101. The mouse 105b is a pointing device, which may be replaced with other kinds of pointing devices such as touchscreen, tablet, touchpad, and trackball. The drive 106 may be an optical disc drive or an interface for Universal Serial Bus (USB) memories. In the former case, the drive 106 reads data out of an optical disc 200 by using a laser light (i.e., as a reflection of light or the lack of same). Optical discs include, for example, Blu-ray Disc (registered trademark), digital versatile disc (DVD), DVD-RAM, compact disc read-only memory (CD-ROM), and CD-Rewritable (CD-RW). The communication interface 107 is connected to a network 50 so as to exchange data with other computers (not illustrated).

The hardware platform described above may be used to realize the processing functions of the second embodiment. That is, the proposed circuit design aiding apparatus 10 may provide the functions of producing a wiring plan for each bus (a bundle of nets) that interconnects BGA devices and other components laid out on a circuit board under development. This wiring plan describes how those buses are routed and which wiring layers are allocated for them. Specifically, the circuit design aiding apparatus 10 may provide functions described below.

Figure 3:
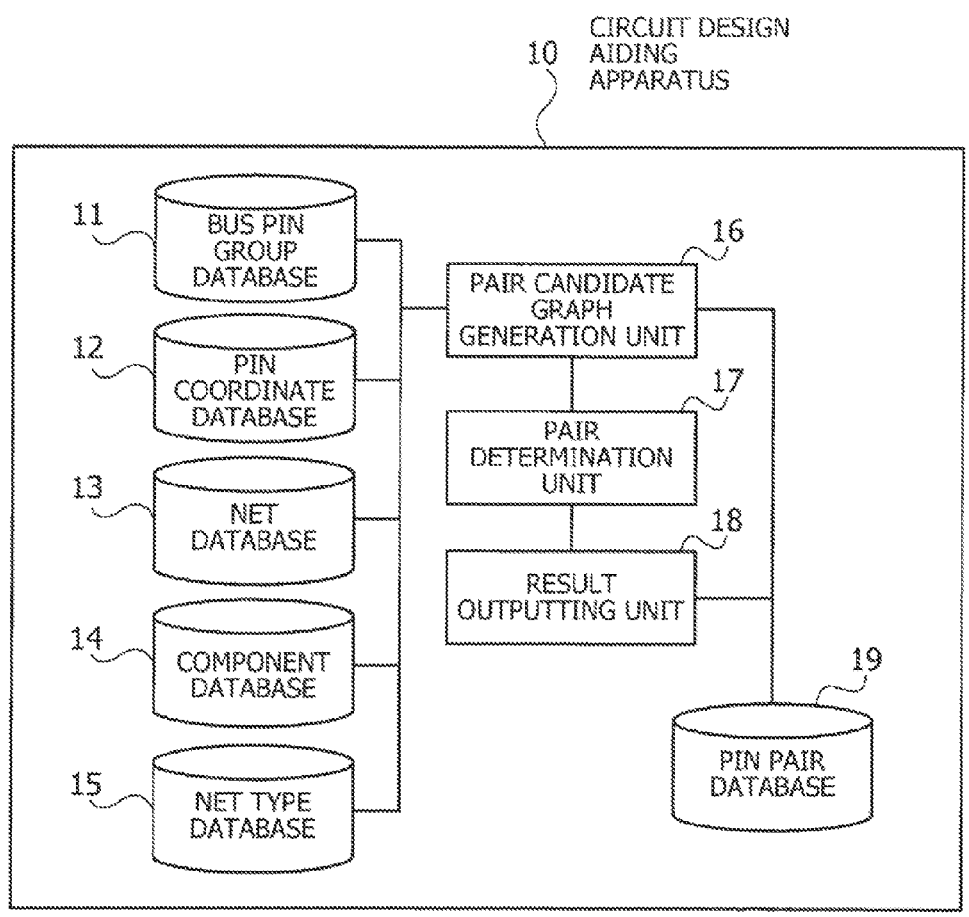
FIG. 3 is a block diagram of a circuit design aiding apparatus according to the second embodiment.

FIG. 3 is a block diagram of the circuit design aiding apparatus 10 according to the second embodiment. The illustrated circuit design aiding apparatus 10 includes a bus pin group database 11, a pin coordinate database 12, a net database 13, a component database 14, a net type database 15, a pair candidate graph generation unit 16, a pair determination unit 17, a result outputting unit 18, and a pin pair database 19.

Figure 4:
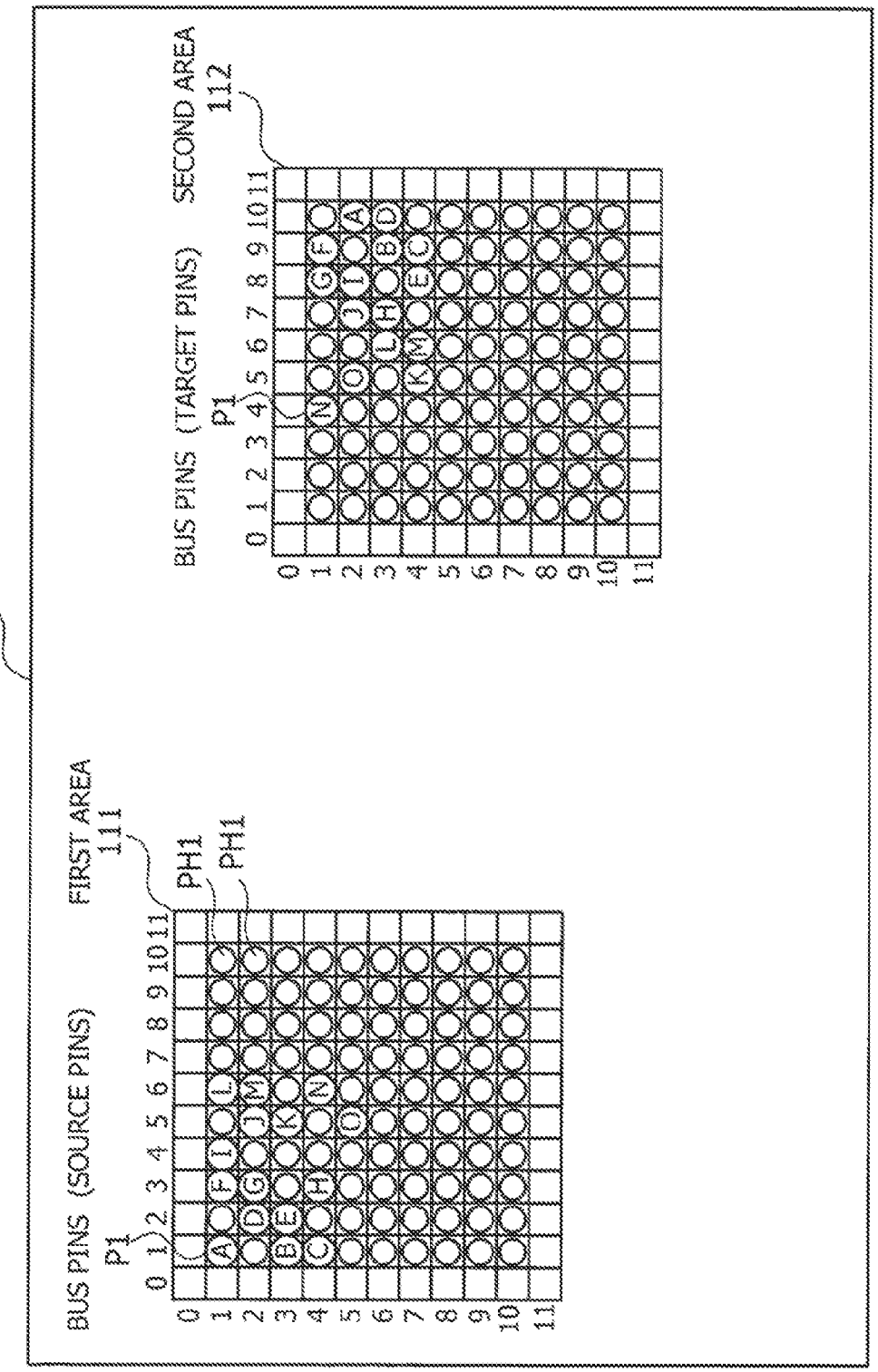
FIG. 4 illustrates data stored in a bus pin group database.

FIG. 4 illustrates data stored in a bus pin group database 11. Specifically, FIG. 4 depicts a circuit board 110 having two areas 111 and 112 in which a plurality of pin holes (or pads) PH1 are formed for mounting components including BGA devices. Some of those pin holes PH1 in the areas 111 and 112 are assigned for bus pins P1. FIG. 4 indicates the net of each bus pin P1 by using upper-case alphabets A to N. Similarly to those bus pins P1 in the first area 111, another set of bus pins P1 are located in the second area 112. The same alphabets are used to indicate which bus pins P1 belong to which net.

The bus pin group database 11 stores information about such bus pins P1 in the first and second areas 111 and 112, including their coordinates, net IDs (logical connection data), pin shape (e.g., round, square), pin radius, and the like. Bus pins P1 may include those for single-ended signals and those for differential signals. The latter group of bus pins P1 is actually a collection of paired bus pins referred to herein as differential pairs. Two bus pins constituting a differential pair are previously associated with each other (i.e., the pairs are established), whereas bus pins for single-ended signals have no particular association with others. For example, two bus pins P1 for net N and net O are established as a pin pair. Bus pins P1 of other nets A to M have no established pairs.

The circuit design aiding apparatus 10 performs routing of single-layer bus wires for the noted group of non-paired nets A to M between the first and second areas 111 and 112. As will be discussed below, the circuit design aiding apparatus 10 combines two nets into one group when determining the routes of bus connections between the two areas 111 and 112. The second embodiment, however, is not limited by this specific example of pin combinations, but may similarly be applied to the cases in which three or more nets are combined into one group for the routing of bus wires.

The first area 111 and second area 112 are previously defined as part of input data for the wiring design. The input data specifies coordinates of bus pins P1 to indicate their relative positions. For example, the upper left corner of the respective areas 111 and 112 are set as the origin (0, 0) of the coordinated system. The position of bus pin P1 of net A is then represented by its coordinates (1, 1) in the first area 111. Where appropriate, bus pins P1 in the first area 111 may be referred to as "source pins P1," while those in the second area 112 may be referred to as "target pins P1."

FIG. 5 depicts an example of data stored in the pin coordinate database 12. According to the second embodiment, the data stored in the pin coordinate database 12 is organized in tabular form. Specifically, FIG. 5 illustrates a net list 12a formed from five data fields with the following labels: "Pin ID," "Pin Group ID," "Net," "Coordinates," and "Pair Pin ID." The data values horizontally arranged in the table are associated with each other to constitute a single record.

The pin ID field contains an identifier (ID) that identifies each specific bus pin P1. Different bus pins P1 have different pin IDs even if they are associated with the same net. The pin group ID field for a specific bus pin P1 contains information that indicates whether the bus pin P1 sits in the first area 111 or the second area 112. In the example of FIG. 5, the pin group ID field gives a value of "L" (left) for bus pins P1 in the first area 111 and "R" for those in the second area 112. The net field contains information that indicates with which net the bus pin P1 is associated. The coordinates field stores relative coordinates indicating the position of the bus pin P1. The pair pin ID field for a bus pin P1 may contain the pin ID of another bus pin P1 that constitutes a differential pair, together with the bus pin P1 of interest. Referring to, for example, the bottommost portion of the net list 12a, the bus pin P1 identified by pin ID "27" is paired with another bus pin P1 identified by pin ID "28," as seen in the pair pin ID field. These two bus pins, 27 and 28, constitute a differential pair.

Referring back to FIG. 3, the net database 13 stores information describing a plurality of nets that belong to a bus. The information may include, among other things, the identifiers of the bus, source pin P1, target pin P1, and wire width. The component database 14, on the other hand, stores information describing the first and second areas 111 and 112. The information may include the reference position of each described area (e.g., the top-left corner of the first area 111) and the center coordinates of the top-left pin (e.g., bus pin P1 with pin ID "1"). Also included is the height and width of the area, pin-to-pin distances, and the number of bus pins P1 constituting an array. The net type database 15 stores information indicating the type of each net.

The pair candidate graph generation unit 16 extracts pair candidates of bus pins P1 on the basis of the net list 12a described above and produces a graph that associates the extracted pair candidates. Here the term "graph" is used in the sense of graph theory. To produce a graph of pair candidates, the pair candidate graph generation unit 16 first creates a source pin distance table that summarizes the distances between bus pins P1 in the first area 111.

FIG. 6 is a diagram used to explain how the pair candidate graph generation unit 16 operates to produce a graph. The illustrated source pin distance table 16a is a collection of pin-to-pin distances that the pair candidate graph generation unit 16 has measured for the source pins P1. Both the rows and columns of this source pin distance table 16a represent different pin IDs, together with their corresponding nets in the parentheses.

As mentioned, the pair candidate graph generation unit 16 measures the distance between each possible combination of source pins P1 and extracts the combinations whose distance values are less than or equal to 2. In other words, source-pin combinations are screened out if their distances exceed 2. It is noted, however, that the distance threshold of 2 is only an example and not to be construed as limitations to any of the embodiments discussed in this specification. FIG. 6 indicates the qualified source pins P1 by hatching the pertinent cells in the source pin distance table 16a. The other cells may include a symbol ">2" or actual distance values of unqualified source pins P1.

The pair candidate graph generation unit 16 then turns to the set of target pins P1 to measure their pin-to-pin distances, thus extracting target-pin combinations whose distance values are less than or equal to 2. The extracted combinations are compiled into a target pin distance table. FIG. 7 is another diagram used to explain how the pair candidate graph generation unit 16 produces a graph of pair candidates. The illustrated target pin distance table 16b gives a collection of pin-to-pin distances that the pair candidate graph generation unit 16 has measured for target pins P1. Both the rows and columns of this target pin distance table 16b represent different pin IDs, together with their corresponding nets in the parentheses. As seen in FIG. 7, the same hatching of the source pin distance table 16a is applied to several cells in the target pin distance table 16b, thereby indicating that their corresponding source pins P1 are within a distance of 2 from each other. The pair candidate graph generation unit 16 measures the distances of target pins P1 corresponding to those hatched cells in the target pin distance table 16b. That is, the pair candidate graph generation unit 16 skips measurement of target pins P1 if their corresponding source pins P1 are of a non-candidate pair rejected as having an excessive distance. Accordingly, the pair candidate graph generation unit 16 evaluates a reduced number of target-pin combinations. FIG. 7 indicates the actual distance values of target-pin combinations, only for the target pins within a distance of 2 (omitting indication for those spaced apart by a distance of more than 2). The pair candidate graph generation unit 16 produces a graph from such combinations of source pins P1 and target pins P1.

Figure 8A:
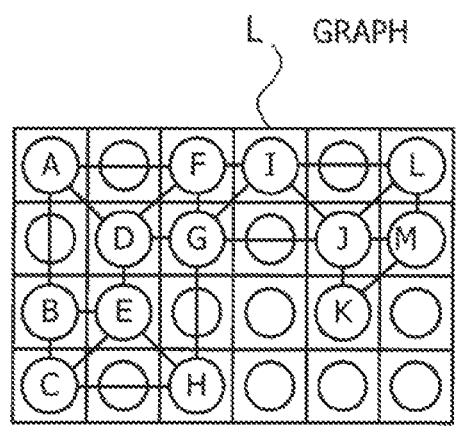
FIGS. 8A and 8B illustrate exemplary graphs produced by the pair candidate graph generation unit.
Figure 8B:
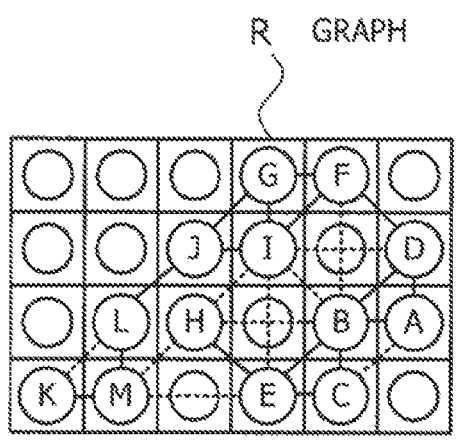

FIGS. 8A and 8B illustrate exemplary graphs produced by the pair candidate graph generation unit. Specifically, FIGS. 8A and 8B illustrate two graphs L and R produced from the foregoing source pin distance table 16a and target pin distance table 16b, respectively. Graph L is formed from a collection of nodes representing source pins P1 and a collection of edges connecting particular pairs of source pins whose distance values in the source pin distance table 16a are less than or equal to 2. Similarly, graph R is formed from a collection of nodes representing target pins P1 and a collection of edges connecting particular pairs of target pins whose distance values in the target pin distance table 16b are less than or equal to 2. It is noted that some target-pin pairs in graph R have a distance of 2 or less, but their associated source-pin pairs in graph L do not. Graph R in FIG. 8B distinguishes such combinations of target pins P1 by using dotted lines. It is also noted that the target-pin combinations indicated by dotted lines are what the pair candidate graph generation unit 16 has skipped in the above-described measurement of target pin distances.

Based on graphs L and R produced by the pair candidate graph generation unit 16, the pair determination unit 17 determines which pairs of bus pins P1 to use in wiring the bus. The use of graphs L and R may reduce the possibilities that the wiring of a pair of nets allows intrusion of some other net. Actually the pair determination unit 17 produces another graph from graph R. This graph, referred to herein as "graph G," includes a collection of vertices that represent the edges of graph R and a collection of edges that connect pairs of vertices corresponding to adjacent edges in graph R. Note that two edges are said to be "adjacent" when they share a vertex. For example, three edges G-J, I-J, and J-L in graph R of FIG. 8B are "adjacent" to each other because all of them are connected to vertex J.

FIG. 9 illustrates an exemplary graph G produced by the pair determination unit 17. FIG. 9 also depicts graph R as the source of graph G. The edges of graph R are respectively assigned a series of numbers, 1 to 16, as their IDs. As seen in FIG. 9, those edge IDs in graph R correspond to vertex IDs in graph G. In other words, each vertex of graph G represents a specific pair candidate. For example, vertex #1 (ID="1") is connected with vertices #2, #3, and #4 in graph G. This means that the pair candidate (A, D) formed from two target pins P1 of net A and net D is adjacent to three pair candidates (A, B), (D, F), and (D, B) of target pins P1. While graph G seen in FIG. 9 has a specific shape, it is possible to draw the same graph G in other forms without changing its logical structure.

The pair determination unit 17 then produces a graph management table describing graph G. The pair determination unit 17 counts the number of edges incident to each specific vertex of graph G. This number is referred to as the "degree" of a vertex in the terminology of graph theory, and the pair determination unit 17 populates the graph management table with the degrees of vertices.

FIG. 10 illustrates an exemplary graph management table. The illustrated graph management table 17a is formed from the following data fields: "GVID," "Net Pair," "Choice," "Sequence Number" (SEQ No.), "Degree," "Adjacent Vertex," "Edge Distance," and "Abandoned Distance." The data values horizontally arranged in the table are associated with each other to constitute a single record.

The graph-G vertex ID (GVID) field contains an identifier that designates a specific vertex of graph G. Each record in the graph management table 17a is uniquely identified by this GVID. The net pair field contains information indicating a pair of nets associated with target pins P1 that constitutes a pair candidate indicated by the GVID field. The choice field indicates whether the pertinent pair candidate has been chosen for wire routing. The wording "chosen for wire routing" means that the pertinent pins and nets will be routed in a pair. The choice field may contain a value of, for example, "Yes" or "No" or "--" to indicate the status of pair candidates. "Yes" means that the pertinent pair candidate has been chosen for wire routing, while "No" indicates that the pertinent pair candidate has been disqualified. The initial state of this choice field is "--" which means that the determination has not yet been made. The sequence number field is initially blank, and given a serial number when the pertinent pair candidate is chosen for wire routing. Those serial numbers represent in what order the pairs have been chosen.

As mentioned above, the number of edges extending from each specific vertex of graph G is counted. The degree field of the graph management table 17a contains the number of edges counted for the pertinent vertex indicated by the GVID field. The adjacent vertex field enumerates GVIDs of vertices that are adjacent to the pertinent vertex. Note that a vertex in a graph is said to be "adjacent" to another vertex when the graph has an edge that connects these vertices together.

The edge distance field is divided into three subfields labeled "L," "R," and "Total." The L subfield contains a distance value of source pins P1 in graph L which are associated with a specific pair of nets indicated in the net pair field. Referring to, for example, the topmost row of the graph management table 17a, the L subfield contains a distance value of 1.4 (truncated to the first decimal place) between two source pins P1 associated with net A and net D. The R subfield contains a distance value of target pins P1 in graph R which are associated with a specific pair of nets indicated in the net pair field. The total subfield then gives the sum of distance values in the L and R subfields.

The abandoned distance field is also divided into three subfields labeled "L," "R," and "Total." The L subfield contains a gross distance of candidate pairs of source pins P1 in graph L which would lose the chance to be chosen for wire routing if the pertinent net pair seen in the net pair field was chosen for wire routing. Similarly, the R subfield contains a gross distance of candidate pairs of target pins P1 in graph R which would lose the chance to be chosen for wire routing if the pertinent net pair seen in the net pair field was chosen for wire routing. The total subfield then gives the sum of distance values in the L and R subfields.

The pair determination unit 17 repeats a process of choosing a pair of target pins P1 from among the pair candidates of target pins P1 by using the graph management table 17a. Details of this iterative process will now be described below.

FIGS. 11 to 17 illustrate operation of the pair determination unit 17. By searching the foregoing graph management table 17a, the pair determination unit 17 obtains GVID of a vertex whose degree is the smallest in graph G. As can be seen from the graph management table 17a of FIG. 11, the vertex with GVID=15 has the smallest degree of 1. Accordingly, the pair determination unit 17 chooses its corresponding pair candidate as a pin pair for wire routing. The target pins P1 of this chosen pair are respectively associated with net K and net M. The pair determination unit 17 enters a value of "Yes" to the choice field of the record with GVID=15. The pair determination unit 17 also gives a value of "1" to the sequence number field of the same record. In this way, the pair determination unit 17 selects target-pin pairs with smaller degrees in preference to others. In other words, the pair determination unit 17 prioritizes the pairs that are less influential on the determination that it performs for other pairs of target pins P1, thus raising the possibility of establishing a larger number of pin pairs.

Figure 11:

Target pins P1 associated with net K and net M have been chosen as a pin pair for wire routing. Referring again to graph R in FIG. 9, the target-pin pair connected by edge #14 (i.e., target pins P1 associated with net M and net L) is no longer allowed to stay as a pair candidate. The pair determination unit 17 therefore removes vertex #14 from graph G. That is, the pair determination unit 17 changes the choice field of the record with GVID=14 from "--" to "No" to indicate the determination result. The pair determination unit 17 further deletes GVID "14" from the adjacent vertex field of the graph management table 17a if any records having "--" in their choice field contain that GVID. In the example of FIG. 11, the record with GVID=13 includes "14" in its adjacent vertex field. Since the number of adjacent vertices associated with this record decreases by one as a result of the deletion of GVID "14," the pair determination unit 17 updates the degree field of that record from "3" to "2" accordingly. FIG. 11 depicts this update of the degree field by circling "2<3" where the symbol "<" means that the degree has been changed from the right value to the left value. The other accompanying drawings may also use such circles or ellipses to emphasize specific portions. The pair determination unit 17 may also update the edge distance field and abandoned distance field of the graph management table 17a to reflect the change in the degree field. Those changes and updates may be made at different times and in a different order. The pair determination unit 17 may skip updating the edge distance and abandoned distance fields when the records already have a value of "Yes" or "No" in their choice field. As seen in FIG. 11 and subsequent drawings of the graph management table 17a, the GVID field, degree field, and adjacent vertex field may be hatched when the records have a value of "No" in the choice field. For such non-chosen records (disqualified pair candidates), the pair determination unit 17 does not update their degree field. The hatching may also be used in the adjacent vertex field of records having "Yes" in their choice field.

Now that one pin pair has been determined above, the pair determination unit 17 examines again the remaining records having "--" in their choice field to seek the GVIDs of records with the smallest degree. As can be seen from the graph management table 17a of FIG. 11, two records designated by GVID=13 and GVID=16 have a degree of 2. The pair determination unit 17 then checks the total subfield of their edge distance field to figure out which pair of target pins P1 has a smaller edge distance value. In the present example, one record with GVID=13 has a total edge distance of 2.8, and so does the other record with GVID=16. In this case, the pair determination unit 17 further consults the total subfield of their abandoned distance field and chooses a target-pin pair that has a larger distance value. As seen in FIG. 11, the former record with GVID=13 has a total abandoned distance of 5.8, while the latter record with GVID=16 has a total abandoned distance of 4.8. Thus the pair determination unit 17 chooses the pair of target pins P1 of net J and net L, as seen in the record with GVID=13 in the graph management table 17a of FIG. 12.

The above choice of the pair candidate with GVID=13 may be justified by the following reason. If the pair with GVID=13 was left unchosen, the target pins P1 associated with a net pair (J, L) would have larger distances from other target pins P1 than in the case of another net pair (E, H) associated with GVID=16. The larger the distances, the smaller the chance of establishing pairs of target pins P1. It is therefore preferable to choose GVID=13 in preference to GVID=16.

After all, the pair determination unit 17 enters a value of "Yes" to the choice field of the record with GVID=13, besides giving a value of "2" to the sequence number field of the same. Referring back to graph R in FIG. 9, the above choice of target pins P1 associated with net J and net L means that the target-pin pairs connected by edges #10 and #12 are no longer allowed to stay as pair candidates. The pair determination unit 17 therefore removes vertices #10 and #12 from graph G. That is, the pair determination unit 17 changes the choice field of the record with GVID=10, as well as that of GVID=12, from "--" to "No" as seen in FIG. 13. The pair determination unit 17 further deletes GVIDs "10" and "12" from the adjacent vertex field of the graph management table 17a if any records having "--" in their choice field contain those GVIDs. In the present example, the record with GVID=5 includes "12" in its adjacent vertex field. Since the number of adjacent vertices associated with this record decreases by one as a result of the deletion of GVIDs "10" and "12," the pair determination unit 17 updates the degree field of that record from "4" to "3" accordingly. Similarly, the pair determination unit 17 updates the degree field of another record with GVID=9 from "4" to "3" because the number of its adjacent vertices decreases by one. The pair determination unit 17 further updates the degree field of yet another record with GVID=11 from "4" to "2" because the number of its adjacent vertices decreases by two.

Now that another pin pair has been determined above, the pair determination unit 17 examines again the remaining records having "--" in their choice field to seek the GVIDs of records with the smallest degree. As can be seen from the graph management table 17a of FIG. 13, two records designated by GVID=11 and GVID=16 have a degree of 2. The pair determination unit 17 then checks the total subfield of their edge distance field to figure out which pair of target pins P1 has a smaller edge distance value. In the present example, the record with GVID=11 has a total edge distance of 2.4, while the record with GVID=16 has a total edge distance of 2.8. The pair determination unit 17 thus takes the former record with GVID=11 and chooses its corresponding pair candidate of target pins P1 as a pair to be routed together. Specifically, the pair determination unit 17 enters a value of "Yes" to the choice field of the record with GVID=11, besides giving a value of "3" to the sequence number field of the same.

Referring again to graph R in FIG. 9, the above choice of target pins P1 associated with net G and net I means that the target-pin pairs connected by edges #5 and #9 are no longer allowed to stay as pair candidates. The pair determination unit 17 therefore removes vertices #5 and #9 from graph G. That is, the pair determination unit 17 changes the choice field of the record with GVID=5, as well as that of GVID=9, from "--" to "No" as seen in FIG. 14. The pair determination unit 17 further deletes GVIDs "5" and "9" from the adjacent vertex field of the graph management table 17a if any records having "--" in their choice field contain those GVIDs. In the present example, the record with GVID=3 includes both GVIDs "5" and "9" in its adjacent vertex field. Since the number of adjacent vertices associated with this record decreases by two as a result of the deletion of GVIDs "5" and "9," the pair determination unit 17 updates the degree field of that record from "4" to "2" accordingly.

Now that yet another pin pair has been determined above, the pair determination unit 17 examines again the remaining records having "--" in their choice field to seek the GVIDs of records with the smallest degree. As can be seen from the graph management table 17a of FIG. 14, two records designated by GVID=3 and GVID=16 have a degree of 2. The pair determination unit 17 then checks the total subfield of their edge distance field to figure out which pair of target pins P1 has a smaller edge distance value. In the present example, one record with GVID=3 has a total edge distance of 2.8, and so does the other record with GVID=16. The pair determination unit 17 further consults the total subfield of their abandoned distance field and chooses a target-pin pair that has a larger distance value. As seen in FIG. 14, the record with GVID=3 has a total abandoned distance of 5.2, while the record with GVID=16 has a total abandoned distance of 4.8. Accordingly, the pair determination unit 17 chooses a pair of target pins P1 of net D and net F corresponding to the former record with GVID=3. The pair determination unit 17 enters a value of "Yes" to the choice field of the record with GVID=13, besides giving a value of "4" to the sequence number field of the same.

Referring again to graph R in FIG. 9, the above choice of target pins P1 associated with net D and net F means that the target-pin pairs connected by edges #1 and #4 are no longer allowed to stay as pair candidates. The pair determination unit 17 therefore removes vertices #1 and #4 from graph G. That is, the pair determination unit 17 changes the choice field of the record with GVID=1, as well as that of GVID=4, from "--" to "No" as seen in FIG. 15. The pair determination unit 17 further deletes GVIDs "1" and "4" from the adjacent vertex field of the graph management table 17a if any records having "--" in their choice field contain those GVIDs. In the present example, the record with GVID=6 includes "4" in its adjacent vertex field. Since the number of adjacent vertices associated with this record decreases by one as a result of the deletion of GVIDs "1" and "4," the pair determination unit 17 updates the degree field of that record from "5" to "4" accordingly. Similarly, the pair determination unit 17 updates the degree field of another record with GVID=7 from "4" to "3" because the number of its adjacent vertices decreases by one. The pair determination unit 17 further updates the degree field of yet another record with GVID=2 from "4" to "2" because the number of its adjacent vertices decreases by two.

Now that one more pin pair has been determined above, the pair determination unit 17 examines again the remaining records having "--" in their choice field to seek the GVIDs of records with the smallest degree. As can be seen from the graph management table 17a of FIG. 15, two records designated by GVID=2 and GVID=16 have a degree of 2. The pair determination unit 17 then checks the total subfield of their edge distance field to figure out which pair of target pins P1 has a smaller edge distance value. In the present example, one record with GVID=2 has a total edge distance of 3, while the other record with GVID=16 has a total edge distance of 2.8. The pair determination unit 17 thus takes the latter record with GVID=16 and chooses its corresponding pair candidate of target pins P1 as a pair to be routed together. Specifically, the pair determination unit 17 enters a value of "Yes" to the choice field of the record with GVID=16, besides giving a value of "5" to the sequence number field of the same.

Referring again to graph R in FIG. 9, the above choice of target pins P1 associated with net E and net H means that the target-pin pairs connected by edges #6 and #8 are no longer allowed to stay as pair candidates. The pair determination unit 17 therefore removes vertices #6 and #8 from graph G. That is, the pair determination unit 17 changes the choice field of the record with GVID=6, as well as that of GVID=8, from "--" to "No" as seen in FIG. 16. The pair determination unit 17 further deletes GVIDs "6" and "8" from the adjacent vertex field of the graph management table 17a if any records having "--" in their choice field contain those GVIDs. In the present example, the record with GVID=2 includes "6" in its adjacent vertex field. Since the number of adjacent vertices associated with this record decreases by one as a result of the deletion of GVIDs "6" and "8," the pair determination unit 17 updates the degree field of that record from "2" to "1" accordingly. Similarly, the pair determination unit 17 updates the degree field of another record with GVID=7 from "3" to "1" because the number of its adjacent vertices decreases by two.

Now that one more pin pair has been determined above, the pair determination unit 17 examines again the remaining records having "--" in their choice field to seek the GVIDs of records with the smallest degree. As can be seen from the graph management table 17a of FIG. 16, two records designated by GVID=2 and GVID=7 have a degree of 1. The pair determination unit 17 then checks the total subfield of their edge distance field to figure out which pair of target pins P1 has a smaller edge distance value. In the present example, one record with GVID=2 has a total edge distance of 3, while the other record with GVID=7 has a total edge distance of 2. The pair determination unit 17 thus takes the latter record with GVID=7 and chooses its corresponding pair candidate of target pins P1 as a pair to be routed together. Specifically, the pair determination unit 17 enters a value of "Yes" to the choice field of the record with GVID=7, besides giving a value of "6" to the sequence number field of the same.

Referring again to graph R in FIG. 9, the above choice of target pins P1 associated with net B and net C means that the target-pin pair connected by edge #2 is no longer allowed to stay as a pair candidate. The pair determination unit 17 therefore removes vertex #2 from graph G. That is, the pair determination unit 17 changes the choice field of the record with GVID=2 from "--" to "No" as seen in FIG. 17. The choice field of every record in the graph management table 17a has been filled with either "Yes" or "No." The pair determination unit 17 thus terminates the process.

Figure 18:
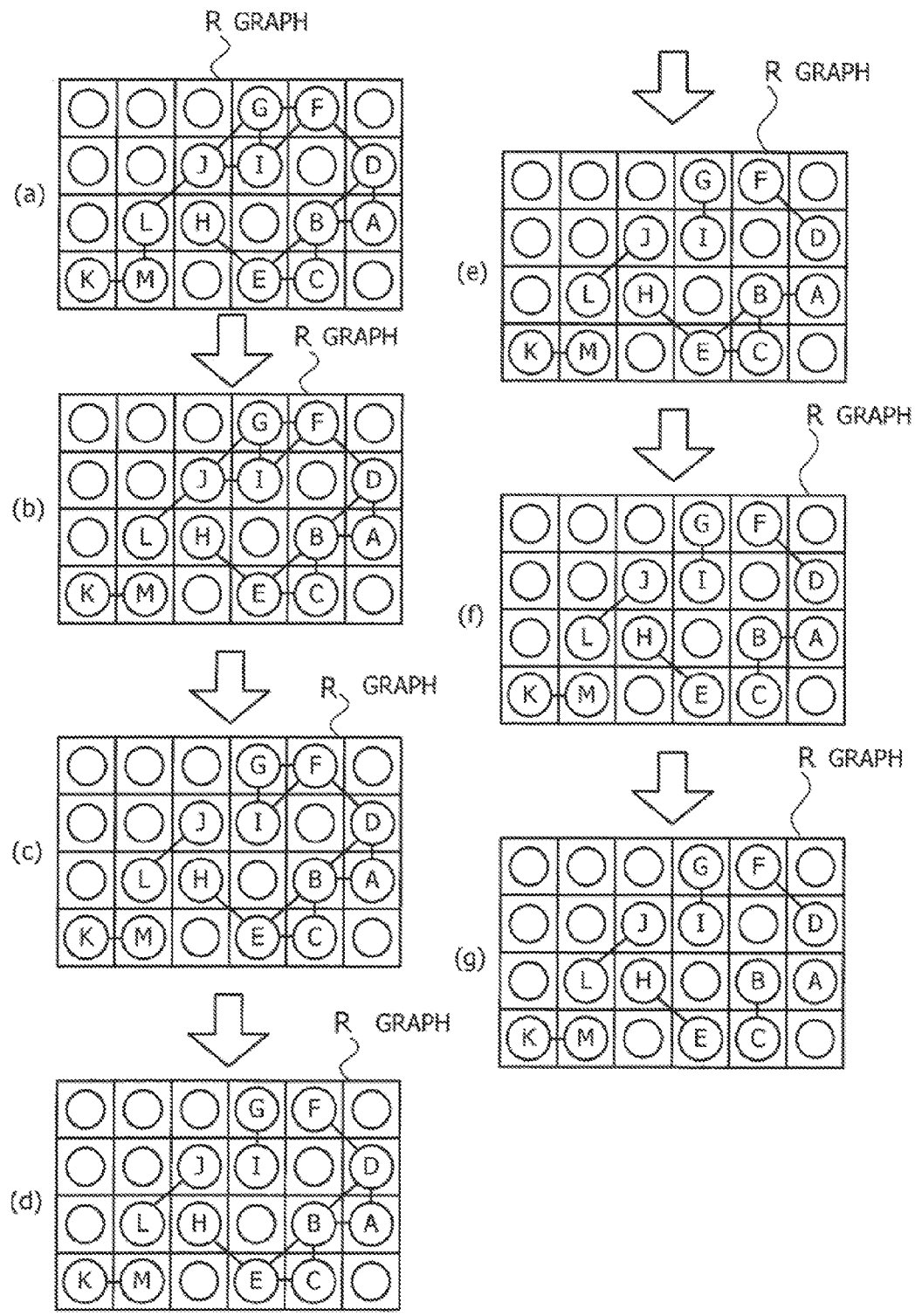
FIG. 18 illustrates how graph R changes with the progress of processing.

FIG. 18 illustrates how graph R changes with the progress of processing. Specifically, eight states (a) to (g) of graph R are illustrated. Graph R changes from state (a) to state (b) when the processing on the graph management table 17a of FIG. 10 modifies its records as seen in FIG. 11. Graph R changes from state (b) to state (c) when the processing on the graph management table 17a of FIG. 11 modifies its records as seen in FIG. 12. Graph R changes from state (c) to state (d) when the processing on the graph management table 17a of FIG. 12 modifies its records as seen in FIG. 13. Graph R changes from state (d) to state (e) when the processing on the graph management table 17a of FIG. 13 modifies its records as seen in FIG. 14. Graph R changes from state (e) to state (f) when the processing on the graph management table 17a of FIG. 14 modifies its records as seen in FIG. 15. Graph R changes from state (f) to state (g) when the processing on the graph management table 17a of FIG. 15 modifies its records as seen in FIG. 16.

The result outputting unit 18 stores in the pin pair database 19 a collection of data about the pairs of target pins that have been chosen by the pair determination unit 17. The result outputting unit 18 may also outputs this pin pair data on a screen of the monitor 104a.

Figure 19A:
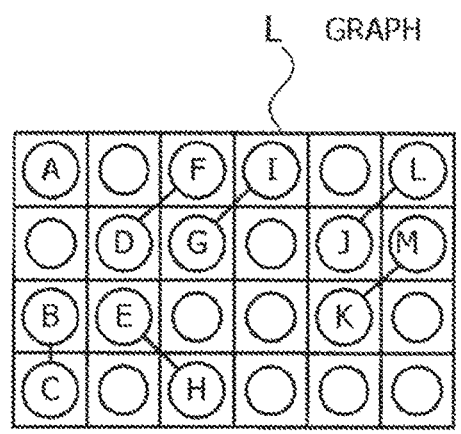
FIGS. 19A and 19B represent data stored in a pin pair database for target-pin pairs.
Figure 19B:
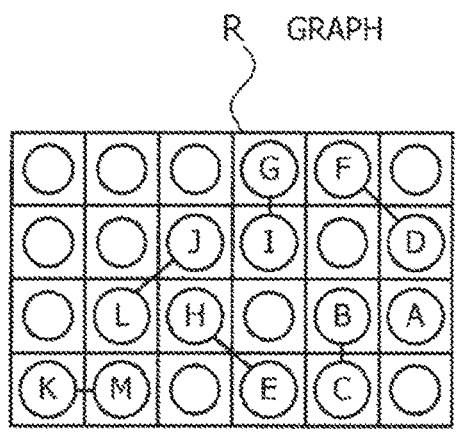

FIGS. 19A and 19B represent data stored in the pin pair database 19 for target-pin pairs. As seen in FIG. 19B, the pin pair database 19 stores data of target-pin pairs that the pair determination unit 17 has determined. This data is what is formed as graph R in state (g) of FIG. 18. The same data of target-pin pairs are reflected back to the set of source pins P1 as in graph L of FIG. 19A.

Figure 21:
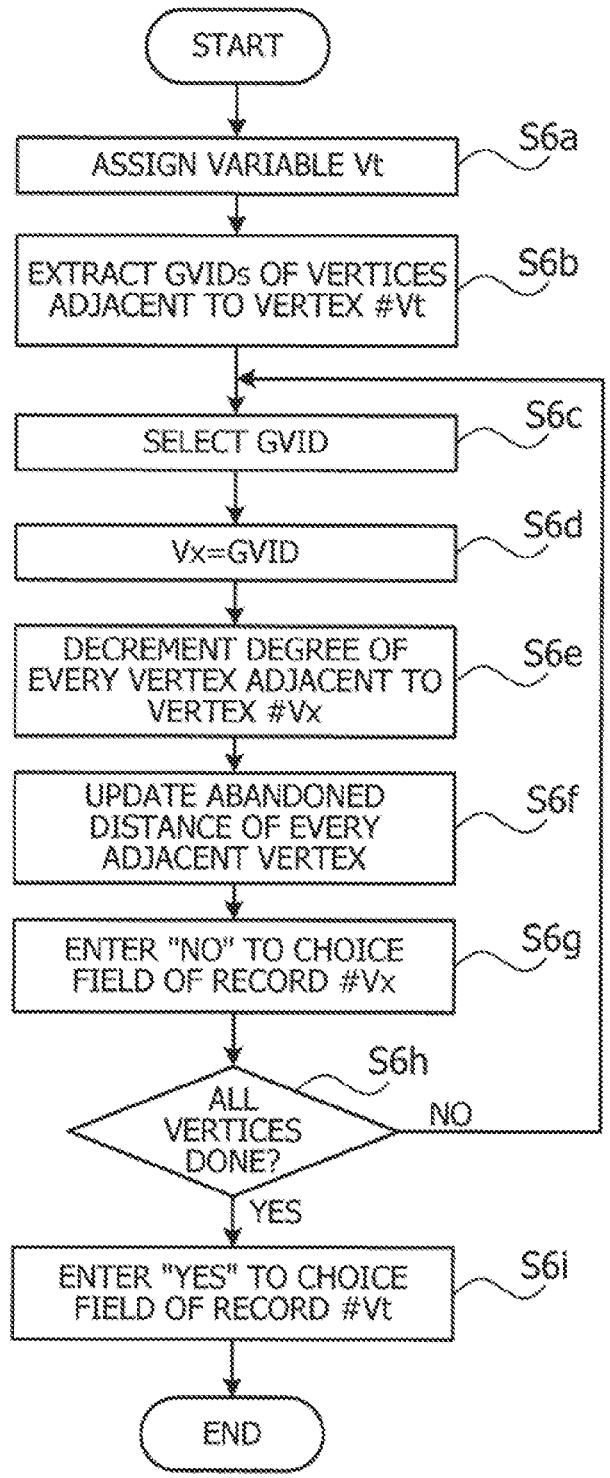
FIG. 21 is a flowchart of a table update routine according to the second embodiment.

Referring now to the flowcharts of FIGS. 20 and 21, operation of the above pair candidate graph generation unit 16 and pair determination unit 17 will be described below. FIG. 20 is a flowchart of a process executed by the pair candidate graph generation unit 16 and pair determination unit 17 according to the second embodiment.

(Step S1) The pair candidate graph generation unit 16 reads coordinate data of a set of source pins P1, as well as a set of target pins P1, from a given net list 12a. The process then advances to step S2.

(Step S2) Based on the coordinate data read above at step S1, the pair candidate graph generation unit 16 measures distances between source pins P1 arranged in a first area 111 and enters each result into a source pin distance table 16a. The pair candidate graph generation unit 16 produces a graph L by extracting combinations of source pins P1 whose distance values are less than or equal to 2. The process then advances to step S3.

(Step S3) The pair candidate graph generation unit 16 now turns to a target pin distance table 16b. For each combination of source pins extracted as having a distance of 2 or less, the pair candidate graph generation unit 16 measures the distance between the corresponding target pins P1 and stores the result into the target pin distance table 16b. The pair candidate graph generation unit 16 then produces another graph R by extracting combinations of target pins P1 whose distance values are less than or equal to 2. The process then advances to step S4.

(Step S4) Based on the above graphs L and R produced at steps S2 and S3, the pair determination unit 17 generates yet another graph G and a graph management table 17a therefor. The process then advances to step S5.

(Step S5) The graph management table 17a contains records marked "--" (undetermined) in their choice field. The pair determination unit 17 sorts those undetermined records by the following three keys: (1) degree (ascending order), (2) total edge distance (ascending order), and (3) abandoned distance (descending order). The process then advances to step S6.

(Step S6) The pair determination unit 17 updates the graph management table 17a based on the sorting result of step S5. Details of this table update routine will be described later. The process advances to step S7 after the table update is finished.

(Step S7) The pair determination unit 17 determines whether all vertices of graph G have undergone the above steps. Specifically, the pair determination unit 17 checks whether the graph management table 17a has any records that have a value of "--" in their choice field. When such records remain in the graph management table 17a (Yes at step S7), the process returns to step S5. The process advances to step S8 when no such records are found in the graph management table 17a, i.e., every record has "Yes" or "No" in its choice field (No at step S7).

(Step S8) The graph management table 17a now contains records with "Yes" in their choice field. The pair determination unit 17 obtains a collection of data describing pairs of target pins P1 associated with those chosen records and enters it into a pin pair database 19. The process of FIG. 20 is thus finished.

The process of FIG. 20 has been explained above. The table update routine of step S6 will now be described in detail below. FIG. 21 is a flowchart of an exemplary table update routine according to the second embodiment.

(Step S6a) The pair determination unit 17 selects a record that has reached the topmost position as a result of the sorting at step S5. The GVID of this selected record is assigned to variable Vt. The process then advances to step S6b.

(Step S6b) The pair determination unit 17 extracts GVID of every vertex adjacent to vertex #Vt (the vertex designated by variable Vt) from the adjacent vertex field of the graph management table 17a. The process then advances to step S6c.

(Step S6c) The pair determination unit 17 selects one of the GVIDs extracted at step S6b. The process then advances to step S6d.

(Step S6d) The pair determination unit 17 assigns the GVID selected at step S6c to variable Vx. The process then advances to step S6e.

(Step S6e) The pair determination unit 17 decrements by one the degree associated with GVID of every vertex adjacent to vertex #Vx in the graph management table 17a. The process then advances to step S6f.

(Step S6f) For every vertex adjacent to vertex #Vx, the pair determination unit 17 updates the abandoned distance field of the graph management table 17a. The process then advances to step S6g.

(Step S6g) The pair determination unit 17 enters a value of "No" to the choice field of the record designated by variable Vx. The process then advances to step S6h.

(Step S6h) The pair determination unit 17 determines whether the above processing of steps S6c to S6g has been applied to all records corresponding to the GVIDs extracted at step S6b. If it is found that the processing has been applied to all pertinent records (Yes at step S6h), the process advances to step S6*i*. Otherwise (No at step S6*h*), the process returns to step S6*c* to repeat the processing for the remaining records.

(Step S6*i*) The pair determination unit 17 enters a value of "Yes" to the choice field of the record designated by variable Vt and exits from the table update routine.

As can be seen from the above description, the proposed circuit design aiding apparatus 10 includes a pair candidate graph generation unit 16 to produce a graph R representing candidates of pairs of bus pins P1 within a specified distance in each of first and second areas 111 and 112. The circuit design aiding apparatus 10 further includes a pair determination unit 17 to determine which pins are to be wired in pairs based on this graph R, thus reducing the likelihood of allowing other wires to intrude into the pairs. The selection of such pin pairs enables the subsequent wire routing process to generate bus wiring patterns in a shorter time because it can determine two net traces at a time. Theoretically, there are N! variations for the order in which N nets are subjected to a wire routing process. The proposed features of the second embodiment reduces this number of variations from N! to (N/2)!. For example, there are 24 variations in the case of N=4. The second embodiment narrows this down to two variations.

(c) Third Embodiment

This section describes a circuit design aiding apparatus according to a third embodiment. The description will focus on its difference from the second embodiment discussed above. See the previous section for details of the elements and features similar to those described in the second embodiment.

The third embodiment is different from the second embodiment in that the circuit design aiding apparatus 10 is designed to operate with two signal categories into which source pins P1 in a first area 111 and target pins P1 in a second area 112 are classified. FIG. 22 illustrates a net list according to the third embodiment. When compared with the foregoing net list 12*a* (FIG. 5), the illustrated net list 12*b* has an additional data field named "Signal Category ID." This signal category ID field may contain a value of either "1" or "2" to indicate different kinds of signals associated with the listed pins. Two nets belonging to the same signal category are allowed to run together in a space between two adjacent pins, whereas those belonging to different categories are not. The board space can therefore be used more efficiently by routing such pairs of nets in the same category in preference to those in different signal categories. The following will now explain how the pair candidate graph generation unit 16 works according to the third embodiment.

The proposed pair candidate graph generation unit 16 uses the above net list 12*b* to produce a graph of pair candidates. According to the third embodiment, the pair candidate graph generation unit 16 measures the distance between each possible combination of source pins P1 and extracts the combinations whose distance values are less than or equal to 2, from among those that belong to the same signal category.

Then as seen in the target pin distance table 16*b* of FIG. 7, the pair candidate graph generation unit 16 measures the distance between each possible combination of target pins P1 whose associated source pins P1 have previously been extracted as being within a distance of 2. The pair candidate graph generation unit 16 extracts the target pin combinations whose distance values are less than or equal to 2, from among those that belong to the same signal category.

Figure 23A:
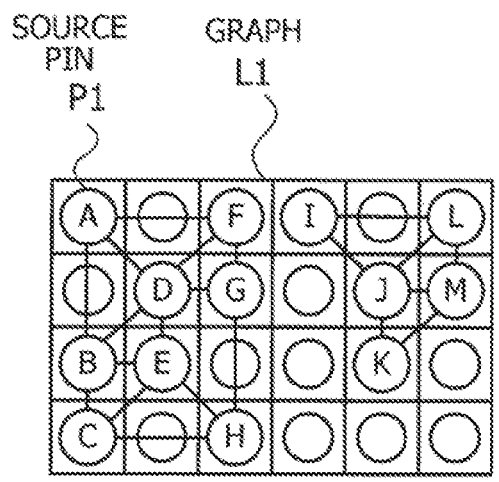
FIGS. 23A and 23B illustrate graphs produced by the pair candidate graph generation unit according to the third embodiment.
Figure 23B:
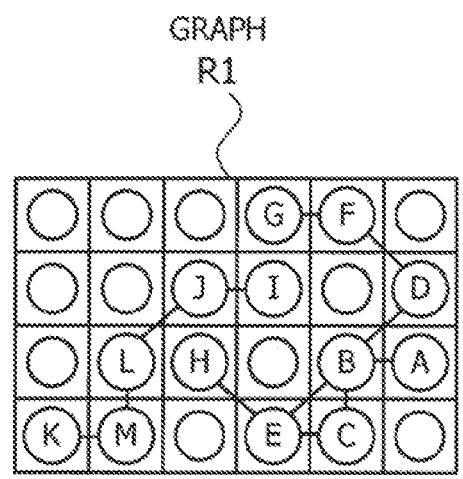

FIGS. 23A and 23B illustrate graphs produced by the pair candidate graph generation unit 16 according to the third embodiment. Specifically, FIG. 23A illustrates graph L1 produced from the source pin distance table 16*a* of FIG. 6 by connecting source pins P1 which belong to the same signal category and whose distance is 2 or less. FIG. 23B illustrates graph R1 produced from the target pin distance table 16*b* of FIG. 7 by connecting target pins P1 which belong to the same signal category and whose distance is 2 or less. Note that these graphs L1 and R1 have no edges that go across different signal categories, meaning that there will be no chances of paring bus pins assigned to different kinds of signals.

The above-described circuit design aiding apparatus 10 of the third embodiment provides similar advantages described previously for its counterpart in the second embodiment. In addition, the proposed circuit design aiding apparatus 10 increases the chances of routing the same kind of signals side by side, thus making more efficient use of wiring space.

Figure 24A:
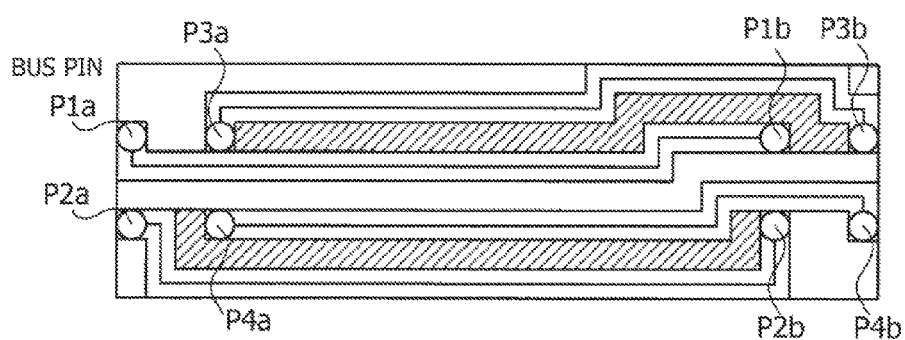
FIGS. 24A and 24B demonstrate why the third embodiment can make efficient use of wiring space.
Figure 24B:
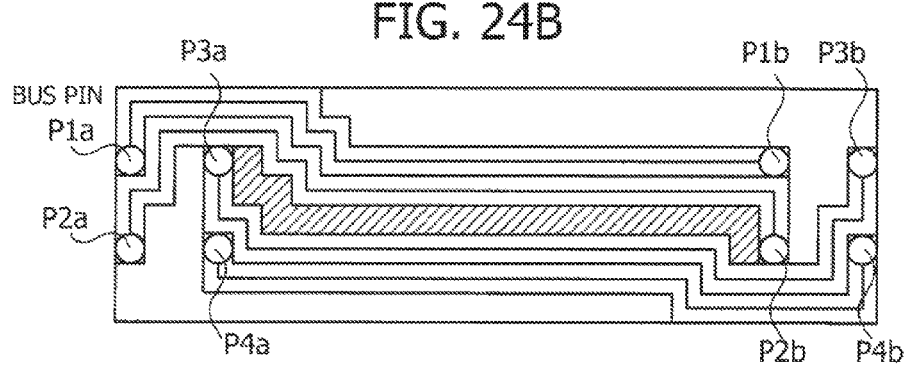

FIGS. 24A and 24B demonstrate why the third embodiment can make efficient use of wiring space. A pair of bus pins P1*a* and P3*a* have the same signal category ID, and another pair of bus pins P2*a* and P4*a* similarly share their signal category IDs. It is assumed that the wiring rules allow a pair or group of traces having the same signal category ID to be routed side by side, whereas those having different signal category IDs are to be routed with a distance of at least one cell. Under those wiring rules, routing the same kind of signal traces side by side is advantageous in terms of efficient use of a limited board space.

For example, FIG. 24A illustrates an example of wire routing without consideration of signal category IDs of the pins. As seen, the traces are routed individually even though their signal category IDs are identical. FIG. 24B, on the other hand, illustrates an example of wire routing performed with consideration of signal category IDs of the pins. The hatched portions in FIGS. 24A and 24B indicate dead spaces in which no other traces can be routed. The hatched area size in FIG. 24B is obviously smaller than that in FIG. 24A. As can be seen from this example, routing the same kind of signal traces side by side is advantageous in terms of efficient use of a limited board space. The third embodiment has been described with an assumption that the circuit design aiding apparatus 10 handles two different signal category IDs. It is noted that the circuit design aiding apparatus 10 may be configured to distinguish three or more different signal category IDs.

(d) Fourth Embodiment

This section describes a circuit design aiding apparatus according to a fourth embodiment. The description will focus on its difference from the third embodiment discussed above. See the previous sections for details of other elements and features.

Figure 25:
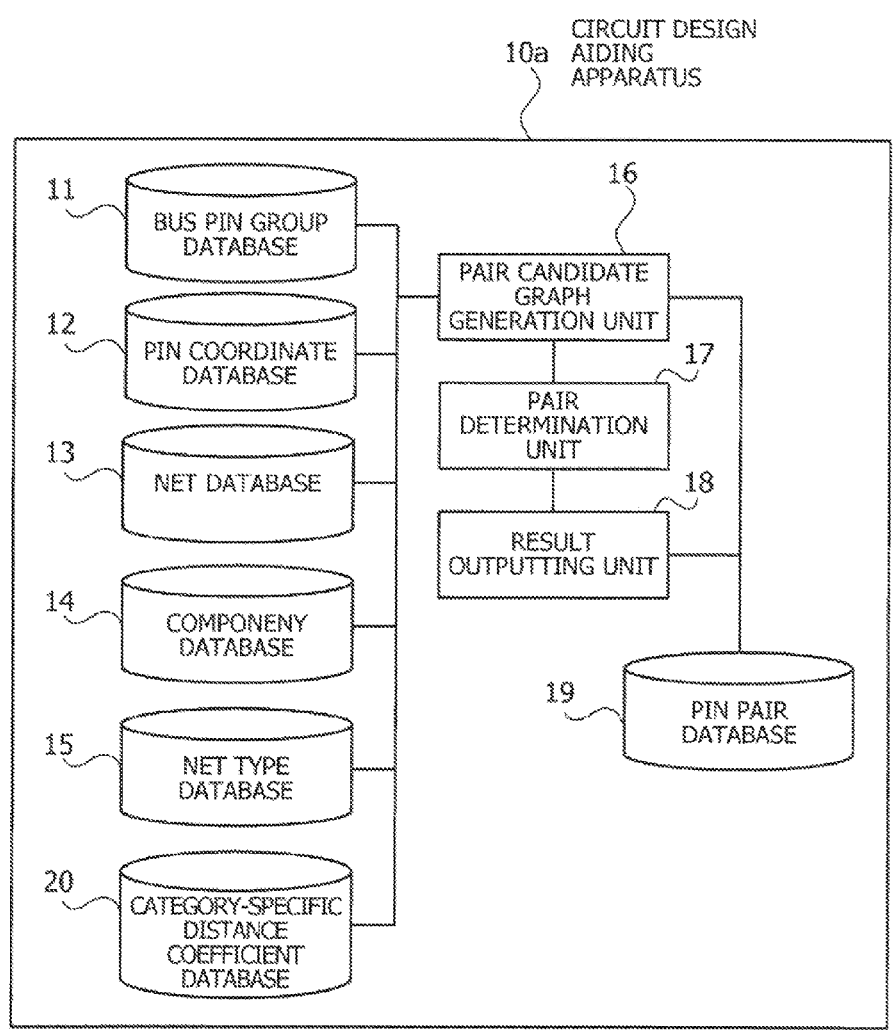
FIG. 25 is a block diagram of a circuit design aiding apparatus according to a fourth embodiment.

FIG. 25 is a block diagram of a circuit design aiding apparatus according to the fourth embodiment. The illustrated circuit design aiding apparatus 10*a* of the fourth embodiment includes a category-specific distance coefficient database 20 (described below) in addition to the elements discussed in FIG. 3 for the second embodiment.

FIG. 26 illustrates a net list according to the fourth embodiment. The illustrated net list 12*c* has a data field named "signal category ID," in which a value of "1," "2," or "3" is contained to indicate what kind of signals are associated.

FIG. 27 illustrates what is stored in the category-specific distance coefficient database 20. The category-specific distance coefficient database 20 stores data in tabular form as seen in FIG. 27. More specifically, FIG. 27 illustrates a distance coefficient table 20*a* formed from three data fields titled as follows: "Signal Category ID (a)," "Signal Category ID (b)," and "Distance Coefficient." The data values horizontally arranged in their respective fields are associated with each other to constitute a single record.

The signal category ID (a) and signal category ID (b) fields provide various combinations of signal category IDs seen in the net list 12c. The distance coefficient field contains a value that indicates likelihood that two bus pins P1 with a specific combination of signal category IDs can be chosen as a pair for wire routing. According to the fourth embodiment, the value "1" indicates the highest likelihood and the value "3" the lowest. For example, this distance coefficient table 20a suggests that source pin P1 #1 (see pin ID field in the net list 12c of FIG. 26) is likely to be paired with source pin P1 #2, #3, #4, #6, or #7, but not with source pin P1 #5. Distance coefficients depend on the category of signals, which are specified in the signal category ID (a) field and signal category ID (b) field. For example, a distance coefficient "1" may be assigned to signals when they are a pair of differential signals. Another distance coefficient "3" may be assigned to signals when the signal category ID (a) field and signal category ID (b) field indicate that one of them is a clock signal.

According to the fourth embodiment, the pair candidate graph generation unit 16 operates as follows. The pair candidate graph generation unit 16 calculates a distance between each possible combination of source pins P1 in the first area 111. Then with reference to the distance coefficient table 20a discussed above, the pair candidate graph generation unit 16 multiplies the distance values of source pin combinations by their relevant distance coefficients, thus obtaining weighted distance values. The pair candidate graph generation unit 16 extracts the source pin combinations whose weighed distance values are less than or equal to 2.

FIG. 28 illustrates a source pin distance table 16c according to the fourth embodiment. The hatched cells in this source pin distance table 16c indicate source-pin pairs with a distance of 2 or less. Some source-pin pairs exceed the distance threshold of 2, unlike their counterparts in the source pin distance table 16a. For those particular source-pin pairs, the source pin distance table 16c of FIG. 28 indicates how their weighted distance values are calculated.

FIG. 29 illustrates a target pin distance table according to the fourth embodiment. The hatched cells in this target pin distance table 16d indicate pairs of target pins P1 with a distance of 2 or less. It is noted that the distance between pin #14 and pin #16 is 1.4, shorter than the threshold of 2. However, this pin pair has no associated edges in graph L2 (described later) and is thus excluded from graph R2 (described later). The same things apply also to the combination of pins #24 and #25.

Figure 30:
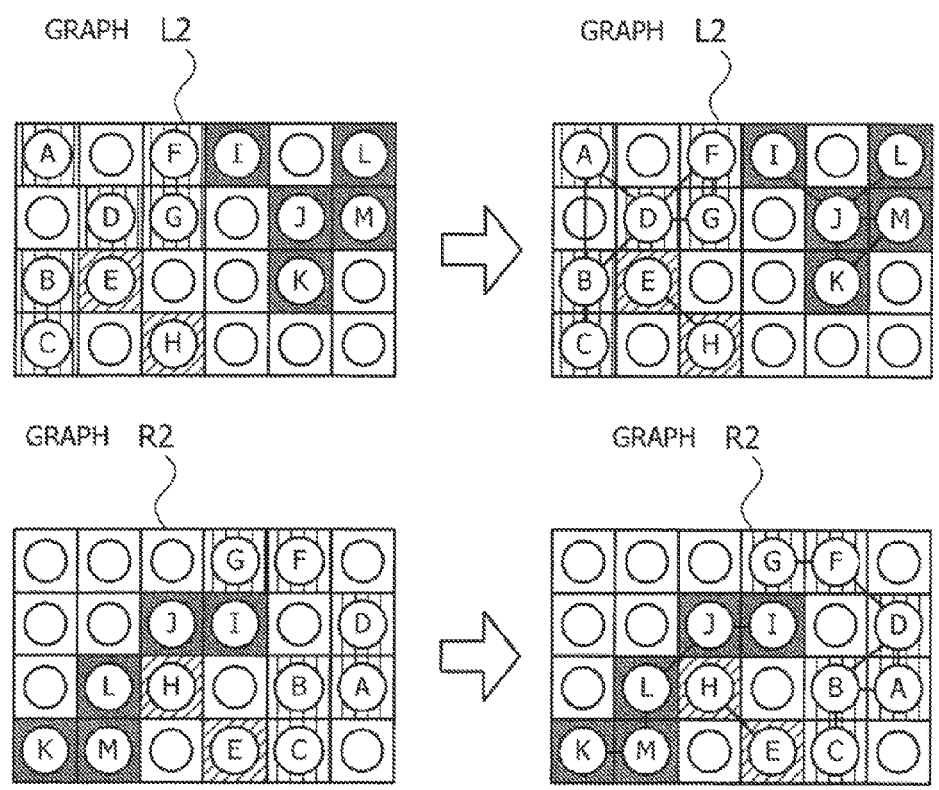
FIG. 30 illustrates exemplary graphs produced by a pair candidate graph generation unit according to the fourth embodiment.

FIG. 30 illustrates exemplary graphs produced by the pair candidate graph generation unit 16 according to the fourth embodiment. Specifically, FIG. 30 illustrates two graphs L2 and R2, each in the form of an array of square cells containing circles that represent bus pins p1. The cells are hatched in several ways to distinguish the signal categories of bus pins P1. Graph L2 is formed from a collection of nodes that represent source pins P1 and a collection of edges that connect pairs of source pins P1 whose distance values in the source pin distance table 16c are less than or equal to 2. Similarly, graph R2 is formed from a collection of nodes that represent target pins P1 and a collection of edges that connect pairs of target pins P1 whose distance values in the target pin distance table 16d are less than or equal to 2. As can be seen from FIG. 30, the source pins P1 are connected by edges only in each signal category, as are the target pins P1, because of the above-described processing by the pair candidate graph generation unit 16 according to the fourth embodiment.

Figure 31:
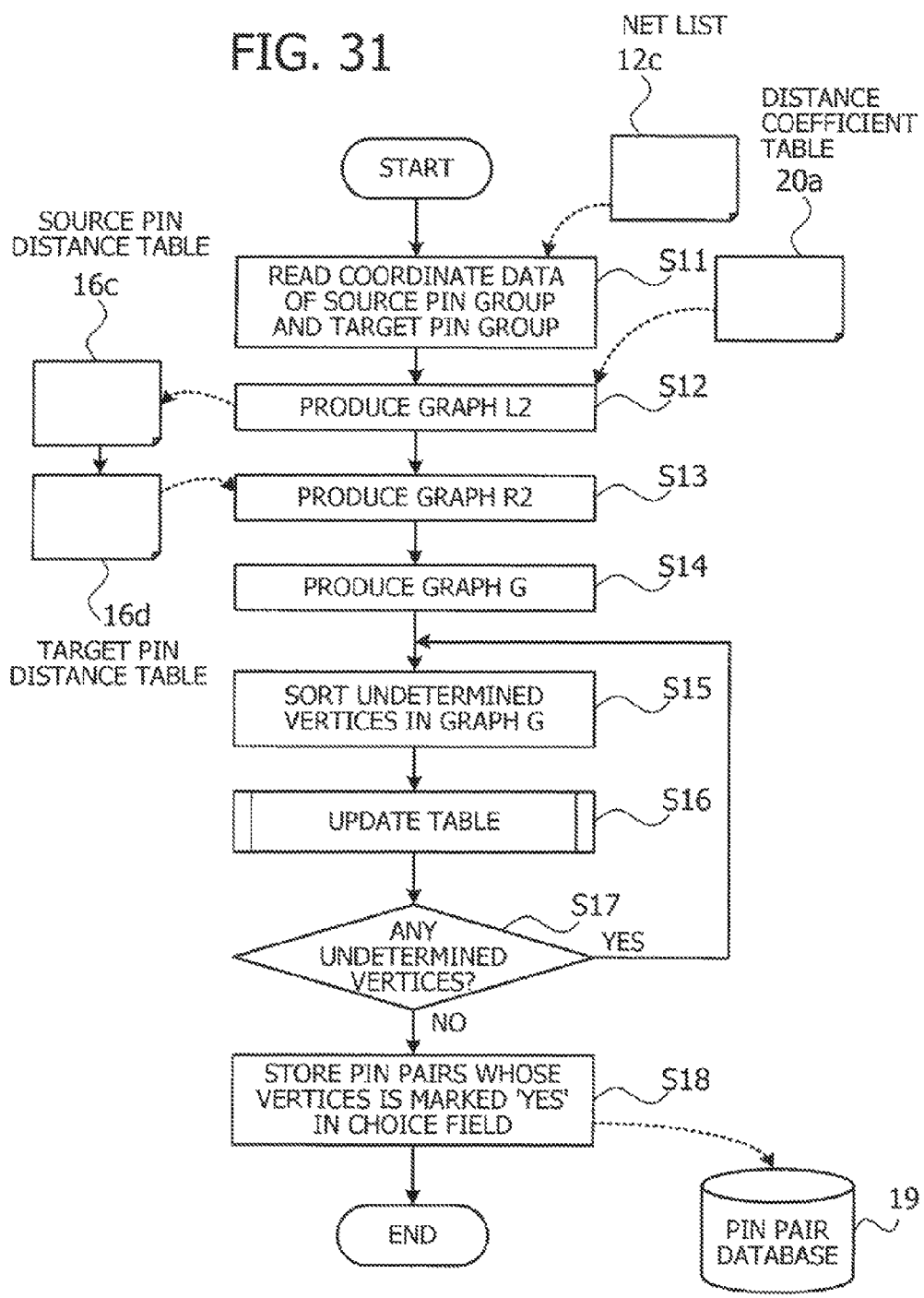
FIG. 31 is a flowchart of a process executed by the pair candidate graph generation unit and pair determination unit according to the fourth embodiment.

Referring now to the flowchart of FIG. 31, operation of the above pair candidate graph generation unit 16 and pair determination unit 17 will be described below.

(Step S11) The pair candidate graph generation unit 16 reads coordinate data of a set of source pins P1, as well as a set of target pins P1, from a given net list 12c. The process then advances to step S12.

(Step S12) Based on the coordinate data read above at step S11, the pair candidate graph generation unit 16 measures distances between source pins P1 arranged in a first area 111. Then with reference to the distance coefficient table 20a discussed above, the pair candidate graph generation unit 16 multiplies the distance values of source pin combinations by their relevant distance coefficients and enters each result into a source pin distance table 16c. The pair candidate graph generation unit 16 produces a graph L2 by extracting combinations of source pins P1 whose distance values are less than or equal to 2. The process then advances to step S13.

(Step S13) The pair candidate graph generation unit 16 now turns to a target pin distance table 16d. For each combination of source pins extracted as having a distance of 2 or less, the pair candidate graph generation unit 16 measures the distance of the corresponding target pins P1. With reference again to the distance coefficient table 20a, the pair candidate graph generation unit 16 multiplies the distance values of target-pin combinations by their relevant distance coefficients and enters each result into the target pin distance table 16d. The pair candidate graph generation unit 16 then produces another graph R2 by extracting combinations of target pins P1 which have their corresponding edges in graph L2 and whose distance values are less than or equal to 2. The process then advances to step S14.

The pair determination unit 17 performs subsequent steps S14 to S18 in a similar way to the foregoing steps S4 to S8. The process of FIG. 31 has been explained above. The above-described circuit design aiding apparatus 10a of the fourth embodiment provides advantages similarly to the foregoing circuit design aiding apparatus 10 of the third embodiment.

(e) Fifth Embodiment

This section describes a circuit design aiding apparatus according to a fifth embodiment. The description will focus on its difference from the foregoing second embodiment. See the previous section for details of the elements and features similar to those described in the second embodiment.

Figure 32:
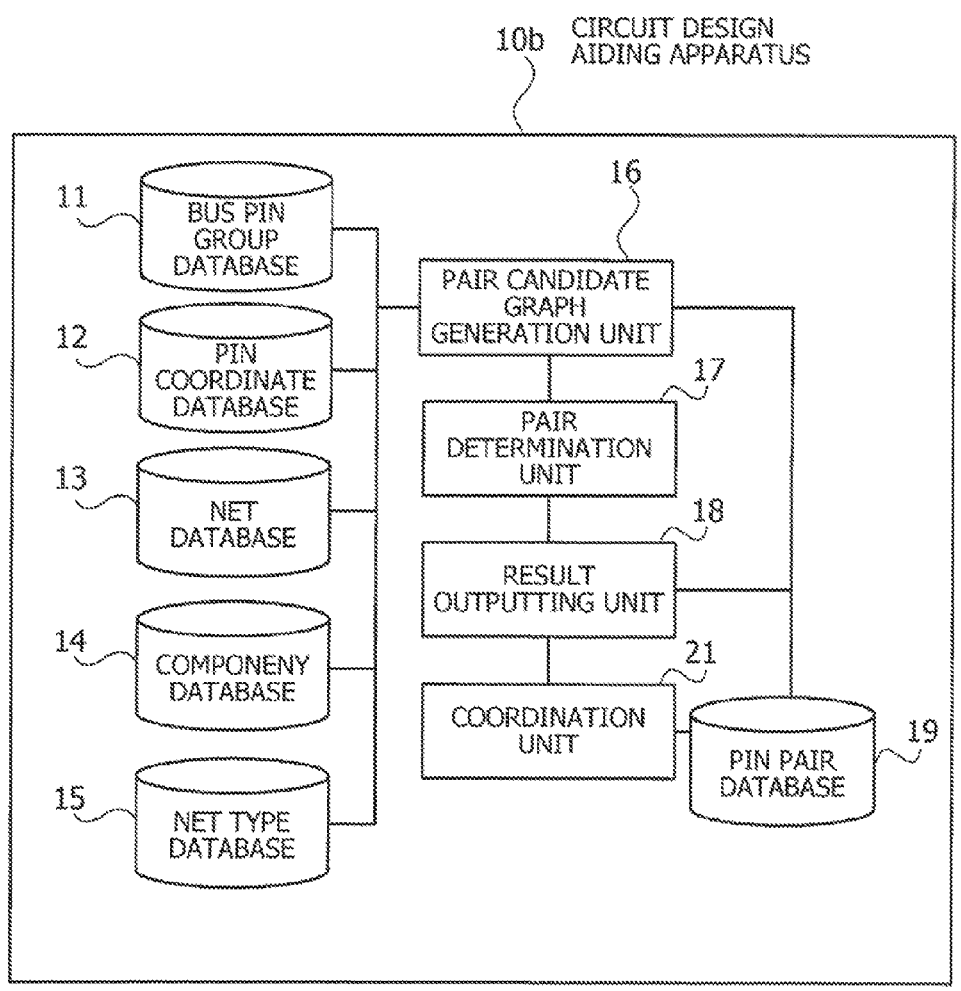
FIG. 32 is a block diagram of a circuit design aiding apparatus according to a fifth embodiment.

According to the fifth embodiment, the pair candidate graph generation unit 16 selects pair candidates with no reference to the assignment of nets to target pins P1 in the second area 112. FIG. 32 is a block diagram of a circuit design aiding apparatus according to the fifth embodiment. The illustrated circuit design aiding apparatus 10b of the fifth embodiment includes a coordination unit 21 in addition to the elements discussed in FIG. 3 for the second embodiment. As will be described below, this coordination unit 21 coordinates the assignment of nets A to M to target pins P1 in the second area 112 according to determination results of the pair determination unit 17. The coordination unit 21 stores the resulting target pin assignment in the pin pair database 19. These features of the circuit design aiding apparatus 10b according to the fifth embodiment may be applied in the case where, for example, the first area 111 is used to mount an application-specific integrated circuit (ASIC) while the second area 112 is used to mount a field-programmable gate array (FPGA).

FIG. 33 illustrates a process executed by a pair candidate graph generation unit of the fifth embodiment. According to the fifth embodiment, the pair candidate graph generation unit 16 produces a graph L in the same way as described in the second embodiment. The pair determination unit 17 then produces another graph G1 by placing a collection of vertices that represent the edges of graph L and a collection of edges that connect pairs of vertices corresponding to adjacent edges in graph L. Note that two edges are referred to as being "adjacent" when they share a vertex. The pair determination unit 17 then produces a graph management table and counts the degree (i.e., the number of incident edges) of each specific vertex of graph G. The pair determination unit 17 populates a relevant data field of the graph management table with the counted degrees of vertices.

FIG. 34 illustrates an example of a graph management table according to the fifth embodiment. The illustrated graph management table 17b is formed from the following data fields: "GVID," "Net Pair," "Choice," "Sequence Number" (SEQ No.), "Degree," "Adjacent Vertex," "Edge Distance," and "Abandoned Distance." The data values horizontally arranged in their respective fields are associated with each other to constitute a single record.

The GVID field contains an identifier that designates a specific vertex of graph G1. The net pair field contains information indicating a pair of nets associated with source pins P1 that constitutes a specific pair candidate indicated by the GVID field. The choice field, degree field, sequence number field, and adjacent vertex field provide information similar to their counterparts in the foregoing graph management table 17a.

The edge distance field contains a distance value of source pins P1 in graph L which are associated with a specific pair of nets indicated in the net pair field. The abandoned distance field contains a gross distance of candidate pairs of source pins P1 in graph L which will lose the chance to be chosen for wire routing if the pertinent net pair indicated in the net pair field is chosen. The pair determination unit 17 repeats a process of choosing a pair of source pins P1 from among those pair candidates by using the graph management table 17a. Details of this iterative process will be described below, with reference to the graph management table 17b.

FIG. 35 to FIG. 41 illustrate how the pair determination unit 17 works according to the fourth embodiment. By searching the graph management table 17b, the pair determination unit 17 obtains GVID of a vertex whose degree is the smallest of all those in graph G1. As can be seen from FIG. 34, the vertex with GVID=24 has a degree of 3, which is the smallest in the graph management table 17b. Accordingly, the pair determination unit 17 chooses its corresponding pair candidate of source pins P1 associated with nets K and M as a pin pair for wire routing. Specifically, the pair determination unit 17 indicates this determination by changing the choice field of the record with GVID=24 from "--" to "Yes" as seen in FIG. 35, besides giving a value of "1" to the sequence number field of the same.

Referring back to graph L in FIG. 33, the above choice of source pins P1 associated with net K and net M means that the source-pin pairs connected by edges #21, #22, and #23 are no longer allowed to stay as pair candidates. The pair determination unit 17 therefore removes vertices #21, #22, and #23 from graph G1. That is, the pair determination unit 17 changes the choice field of the records with GVID=21, 22, and 23 from "--" to "No" to indicate the determination result as seen in FIG. 36. The pair determination unit 17 further deletes GVIDs "21," "22," and "23" from the adjacent vertex field of the graph management table 17b if any records having "--" in their choice field contain those GVIDs. In the present example, the record with GVID=16 includes two GVIDs "22" and "23" in its adjacent vertex field. Since the number of adjacent vertices associated with this record decreases by two as a result of the deletion of GVIDs "21," "22," and "23," the pair determination unit 17 updates the degree field of that record from "9" to "7" accordingly. Likewise, the pair determination unit 17 updates the degree field of the record with GVID=18 from "7" to "5" because two adjacent vertices drop off as a result of the noted deletion. The pair determination unit 17 also updates the degree field of the record with GVID=19 from "5" to "4" because one adjacent vertex drops off as a result of the noted deletion. Further, the pair determination unit 17 updates the degree field of the record with GVID=20 from "6" to "3" because three adjacent vertices drop off as a result of the noted deletion.

Now that one pin pair has been determined above, the pair determination unit 17 examines again the remaining records having "--" in their choice field to seek the GVIDs of records with the smallest degree. As can be seen from FIG. 36, the vertex with GVID=20 has a degree of 3, which is the smallest in the graph management table 17b. Thus the pair determination unit 17 chooses the pair of source pins P1 of net J and net L in that record. That is, the pair determination unit 17 enters a value of "Yes" to the choice field of the record with GVID=20, besides giving a value of "2" to the sequence number field of the same.

Figure 37:

Referring again to graph L in FIG. 33, the above choice of source pins P1 associated with net J and net L means that the source-pin pairs connected by edges #16, #18, and #19 are no longer allowed to stay as pair candidates. The pair determination unit 17 therefore removes vertices #16, #18, and #19 from graph G1. That is, the pair determination unit 17 changes the choice field of the record with GVID=16, as well as those of GVID=18 and GVID=19, from "--" to "No" as seen in FIG. 37. The pair determination unit 17 further deletes GVIDs "16," "18," and "19" from the adjacent vertex field of the graph management table 17b if any records having "--" in their choice field contain those GVIDs. In the present example, the record with GVID=10 includes "16" in its adjacent vertex field. Since the number of adjacent vertices associated with this record decreases by one as a result of the deletion of GVIDs "16," "18," and "19," the pair determination unit 17 updates the degree field of the record from "8" to "7" accordingly. Similarly, the pair determination unit 17 updates the degree field of the record with GVID=11 from "9" to "8" because one adjacent vertex drops off as a result of the noted deletion. The pair determination unit 17 also updates the degree field of the record with GVID=13 from "9" to "8" because one adjacent vertex drops off as a result of the noted deletion. The pair determination unit 17 further updates the degree field of the record with GVID=14 from "6" to "4" because two adjacent vertices drop off as a result of the noted deletion. The pair determination unit 17 further updates the degree field of the record with GVID=15 from "8" to "5" because three adjacent vertices drop off as a result of the noted deletion. The pair determination unit further updates the degree field of the record with GVID=17 from "7" to "6" because one adjacent vertex drops off as a result of the noted deletion.

Now that one more pin pair has been determined above, the pair determination unit 17 examines again the remaining records having "--" in their choice field to seek the GVIDs of records with the smallest degree. As can be seen from the graph management table 17b of FIG. 37, two vertices with GVID=7 and GVID=14 have a degree of 4. The pair determination unit 17 now checks their edge distance field to figure out which pair of source pins P1 has a smaller edge distance value. In the present example, the record with GVID=7 has an edge distance of 2, while the record with GVID=14 has an edge distance of 1. Thus the pair determination unit 17 chooses a pair of source pins P1 of net F and net I corresponding to the latter record with GVID=14. Specifically, the pair determination unit 17 enters a value of "Yes" to the choice field of the record with GVID=14, besides giving a value of "3" to the sequence number field of the same. It is noted that FIG. 37 to FIG. 41 omit the net pair field because of the limitation of space.

Referring again to graph L in FIG. 33, the above choice of source pins P1 associated with net F and net I means that four source-pin pairs connected by edges #1, #8, #10, and #15 are no longer allowed to stay as pair candidates. The pair determination unit 17 therefore removes vertices #1, #8, #10, and #15 from graph G1. That is, the pair determination unit 17 changes the choice field of the records with GVID=1, 8, 10, and 15 from "--" to "No" as seen in FIG. 38. The pair determination unit 17 further deletes GVIDs "1," "8," "10," and "15" from the adjacent vertex field of the graph management table 17b if any records having "--" in their choice field contain those GVIDs. In the present example, the record with GVID=2 includes "1" in its adjacent vertex field. Since the number of adjacent vertices associated with this record decreases by one as a result of the deletion of GVIDs "1," "10," and "15," the pair determination unit 17 updates the degree field of that record from "5" to "4" accordingly. Similarly, the pair determination unit 17 updates the degree field of the record with GVID=3 from "7" to "6" because one adjacent vertex drops off as a result of the noted deletion. The pair determination unit 17 also updates the degree field of the record with GVID=9 from "6" to "4" because two adjacent vertices drop off as a result of the noted deletion. The pair determination unit 17 further updates the degree field of the record with GVID=11 from "8" to "5" because three adjacent vertices drop off as a result of the noted deletion. The pair determination unit 17 further updates the degree field of the record with GVID=12 from "8" to "7" because one adjacent vertex drops off as a result of the noted deletion. The pair determination unit 17 further updates the degree field of the record with GVID=13 from "8" to "6" because two adjacent vertices drop off as a result of the noted deletion. The pair determination unit 17 further updates the degree field of the record with GVID=17 from "6" to "4" because two adjacent vertices drop off as a result of the noted deletion.

Now that one more pin pair has been determined above, the pair determination unit 17 examines again the remaining records having "--" in their choice field to seek the GVIDs of records with the smallest degree. As can be seen from the graph management table 17b of FIG. 38, four vertices with GVID=2, 7, 9, and 17 have a degree of 4. The pair determination unit 17 then checks their edge distance field to figure out which pair of source pins P1 has a smaller edge distance value. In the present example, three records with GVID=2, 7, and 17 have an edge distance of 2, while one record with GVID=9 has an edge distance of 1.4. The pair determination unit 17 therefore chooses a pair of source pins P1 of net A and net D corresponding to the latter record with GVID=9. Specifically, the pair determination unit 17 enters a value of "Yes" to the choice field of the record with GVID=9, besides giving a value of "4" to the sequence number field of the same.

Referring again to graph L in FIG. 33, the above choice of source pins P1 associated with net A and net D means that the source-pin pairs connected by edges #2, #3, #11, and #12 are no longer allowed to stay as pair candidates. The pair determination unit 17 therefore removes vertices #2, #3, #11, and #12 from graph G1. That is, the pair determination unit 17 changes the choice field of the records with GVID=2, 3, 11, and 12 from "--" to "No" as seen in FIG. 39. The pair determination unit 17 further deletes GVIDs "2," "3," "11," and "12" from the adjacent vertex field of the graph management table 17b if any records having "--" in their choice field contain those GVIDs. In the present example, the record with GVID=4 includes "2," "3," and "12" in its adjacent vertex field. Since the number of adjacent vertices associated with this record decreases by three as a result of the deletion of GVIDs "2," "11," and "12," the pair determination unit 17 updates the degree field of the record from "7" to "4" accordingly. Similarly, the pair determination unit 17 updates the degree field of the record with GVID=5 from "5" to "3" as seen in FIG. 39 because two adjacent vertices drop off as a result of the noted deletion. The pair determination unit 17 also updates the degree field of the record with GVID=6 from "6" to "5" because one adjacent vertex drops off as a result of the noted deletion. The pair determination unit further updates the degree field of the record with GVID=13 from "6" to "4" because two adjacent vertices drop off as a result of the noted deletion. The pair determination unit 17 further updates the degree field of the record with GVID=17 from "4" to "3" because one adjacent vertex drops off as a result of the noted deletion. The pair determination unit 17 further updates the degree field of the record with GVID=25 from "6" to "5" because one adjacent vertex drops off as a result of the noted deletion.

Now that one more pin pair has been determined above, the pair determination unit 17 examines again the remaining records having "--" in their choice field to seek the GVIDs of records with the smallest degree. As can be seen from the graph management table 17b of FIG. 39, two vertices with GVID=5 and 17 have a degree of 3. The pair determination unit 17 then checks their edge distance field to figure out which pair of source pins P1 has a smaller edge distance value. In the present example, the record with GVID=5 has an edge distance of 1, while the record with GVID=17 has an edge distance of 2. The pair determination unit 17 therefore chooses the pair of source pins P1 of net B and net C corresponding to the former record with GVID=5. Specifically the pair determination unit 17 enters a value of "Yes" to the choice field of the record with GVID=5, besides giving a value of "5" to the sequence number field of the same.

Referring again to graph L in FIG. 33, the above choice of source pins P1 associated with net B and net C means that the source-pin pairs connected by edges #4, #6, and #7 are no longer allowed to stay as pair candidates. The pair determination unit 17 therefore removes vertices #4, #6, and #7 from graph G1. Specifically the pair determination unit 17 changes the choice field of the records designated by GVID=4, 6, and 7 from "--" to "No" as seen in FIG. 40. The pair determination unit 17 further deletes GVIDs "4," "6," and "7" from the adjacent vertex field of the graph management table 17b if any records having "--" in their choice field contain those GVIDs. In the present example, the record with GVID=13 includes "4" and "6" in its adjacent vertex field. Since the number of adjacent vertices associated with this record decreases by two as a result of the deletion of GVIDs "4," "6," and "7," the pair determination unit 17 updates the degree field of that record from to "2" accordingly. Similarly, the pair determination unit 17 updates the degree field of the record with GVID=17 from "3" to "2" because one adjacent vertex drops off as a result of the noted deletion. The pair determination unit 17 also updates the degree field of the record with GVID=25 from "5" to "2" because three adjacent vertices drop off as a result of the noted deletion.

Now that one more pin pair has been determined above, the pair determination unit 17 examines again the remaining records having "--" in their choice field to seek the GVIDs of records with the smallest degree. As can be seen from the graph management table 17b of FIG. 42, three vertices with GVID=13, 17, and 25 have a degree of 2. The pair determination unit 17 then checks their edge distance field to figure out which pair of source pins P1 has a smaller edge distance value. In the present example, two records with GVID=13 and 25 have an edge distance of 1.4, while one record with GVID=17 has an edge distance of 2. The pair determination unit 17 then examines the abandoned distance field of the former two records to figure out which pair of source pins P1 has a smaller abandoned distance value. Since both records in question have the same abandoned distance of 3.4 in the present case, the pair determination unit 17 compares their initial values of the degree field (i.e., initial numbers of adjacent vertices) to choose a pair candidate having a smaller degree. Referring to FIG. 40, the record with GVID=13 has an initial degree of 9, while the record with GVID=25 has an initial degree of 6. The pair determination unit 17 therefore chooses the pair of source pins P1 of net E and net H corresponding to the latter record with GVID=25. Specifically the pair determination unit 17 enters a value of "Yes" to the choice field of the record with GVID=25, besides giving a value of "6" to the sequence number field of the same.

Referring again to graph L in FIG. 33, the above choice of source pins P1 associated with net E and net H means that the source-pin pairs connected by edges #13 and #17 are no longer allowed to stay as pair candidates. The pair determination unit 17 therefore removes vertices #13 and #17 from graph G1. Specifically the pair determination unit 17 changes the choice field of the records with GVID=13 and 17 from "--" to "No" as illustrated in FIG. 41. In the way described above, the choice field of every record in the graph management table 17b has been filled with either "Yes" or "No." The pair determination unit 17 thus terminates the process.

Figure 42:
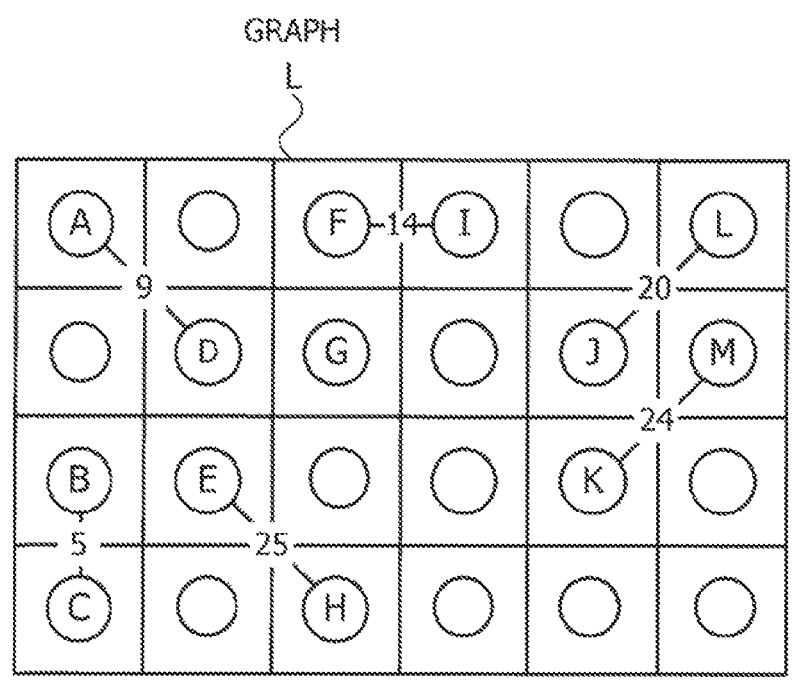
FIG. 42 illustrates data representing source-pin pairs which have been selected and stored in a pin pair database according to the fifth embodiment.

FIG. 42 illustrates data representing source-pin pairs which have been selected and stored in a pin pair database according to the fifth embodiment. The illustrated source pins P1 are paired by six edges corresponding to the records with GVID=5, 9, 14, 20, 24, and 25 in the foregoing graph management table 17b, marked "Yes" in the choice field.

Figure 43:
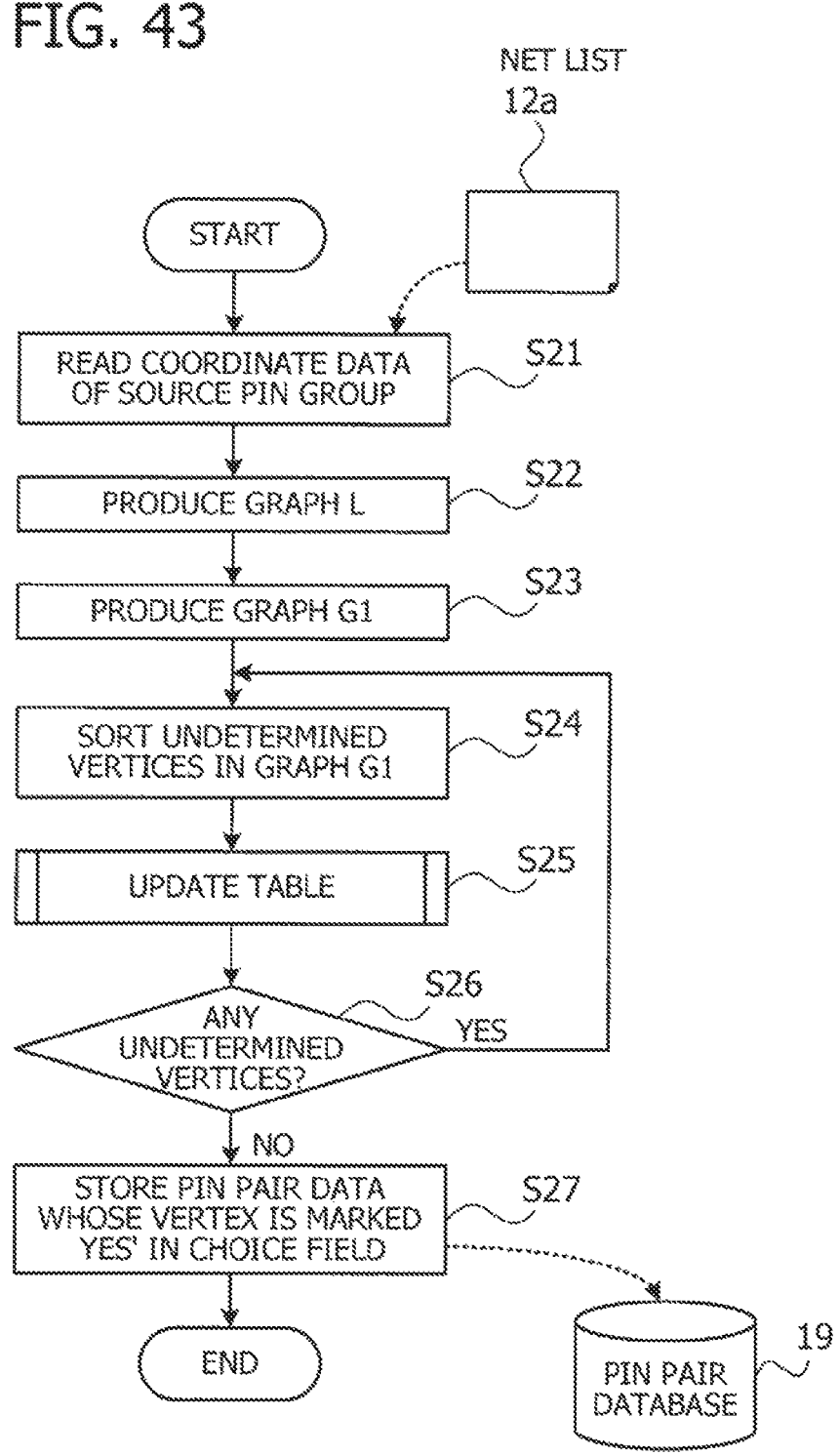
FIG. 43 is a flowchart of a process executed by the pair candidate graph generation unit and pair determination unit according to the fifth embodiment.

FIG. 43 is a flowchart of a process executed by the pair candidate graph generation unit 16 and pair determination unit 17 according to the fifth embodiment.

(Step S21) The pair candidate graph generation unit 16 reads coordinate data of a set of source pins P1 from a given net list 12a. The process then advances to step S22.

(Step S22) Based on the coordinate data read above at step S21, the pair candidate graph generation unit 16 measures distances between source pins P1 arranged in a first area 111. Then with reference to the foregoing distance coefficient table 20a, the pair candidate graph generation unit 16 multiplies the distance values of source pin combinations by their relevant distance coefficients and enters each result into a source pin distance table 16c. The pair candidate graph generation unit 16 produces a graph L by extracting combinations of source pins P1 whose distance values are less than or equal to 2. The process then advances to step S23.

(Step S23) Based on graph L produced above at step S22, the pair determination unit 17 generates another graph G1 and a graph management table 17b therefor. The process then advances to step S24.

(Step S24) The graph management table 17b contains records marked "--" (undetermined) in their choice field. The pair determination unit 17 sorts those undetermined records by the following four keys: (1) degree (ascending order), (2) edge distance in graph L (ascending order), (3) abandoned distance (descending order), and (4) initial order (ascending order). The process then advances to step S25.

(Step S25) The pair determination unit 17 updates the graph management table 17b based on the sorting result of step S24. Details of this table update routine will be described later. The process advances to step S26 after the table update is finished.

(Step S26) The pair determination unit 17 determines whether all vertices of graph G1 have undergone the above steps. Specifically, the pair determination unit 17 checks whether the graph management table 17b has any records that have a value of "--" in their choice field. When such records remain in the graph management table 17b (Yes at step S26), the process returns to step S24. The process advances to step S27 when no such records are found in the graph management table 17b, i.e., every record has "Yes" or "No" in its choice field (No at step S26).

(Step S27) The graph management table 17a now contains records with "Yes" in their choice field. The pair determination unit 17 obtains a collection of data describing pairs of bus pins P1 associated with those chosen records and enters it into a pin pair database 19. The process of FIG. 43 is thus finished.

Figure 44:
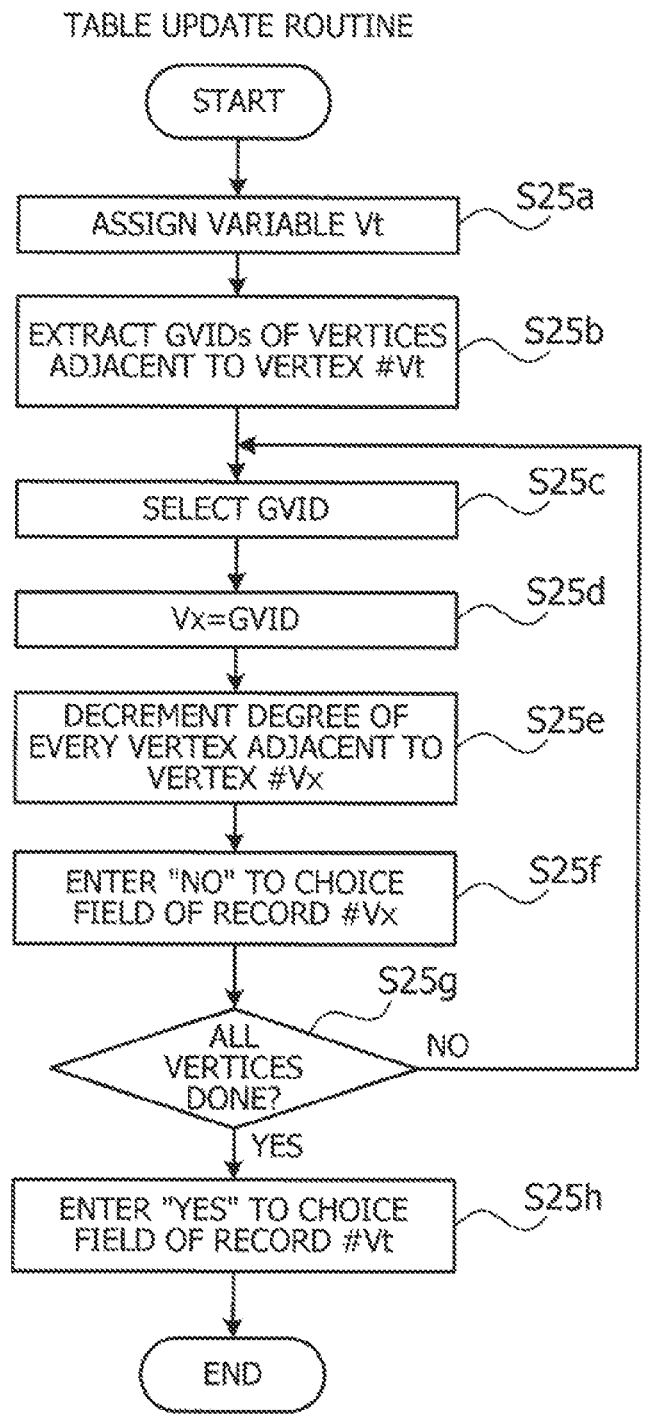
FIG. 44 is a flowchart of a table update routine according to the fifth embodiment.

The table update routine mentioned above at step S25 will now be described in detail below. FIG. 44 is a flowchart of a table update routine according to the fifth embodiment.

(Step S25a) The pair determination unit 17 selects a record that has reached the topmost position as a result of the sorting at step S24 and assigns its GVID to variable Vt. The process then advances to step S25b.

(Step S25b) The pair determination unit 17 extracts GVID of every vertex adjacent to vertex #Vt (vertex designated by variable Vt) from the adjacent vertex field of the graph management table 17b. The process then advances to step S25c.

(Step S25c) The pair determination unit 17 selects one of the GVIDs extracted at step S25b. The process then advances to step S25d.

(Step S25d) The pair determination unit 17 assigns the GVID selected at step S25c to variable Vx. The process then advances to step S25e.

(Step S25e) The pair determination unit 17 decrements by one the degree associated with GVID of every vertex adjacent to vertex #Vx in the graph management table 17b. The process then advances to step S25f.

(Step S25f) The pair determination unit 17 enters a value of "No" to the choice field of the record designated by variable Vx. The process then advances to step S25g.

(Step S25g) The pair determination unit 17 determines whether the above processing of steps S25c to S25f has been applied to all records corresponding to the GVIDs extracted at step S25b. If it is found that the processing has been applied all pertinent records (Yes at step S25g), the process advances to step S25h. Otherwise (No at step S25g), the process returns to step S25c to repeat the processing for the remaining records.

(Step S25h) The pair determination unit 17 enters a value of "Yes" to the choice field of the record designated by variable Vt and exits from the table update routine.

The above-described circuit design aiding apparatus 10b of the fifth embodiment provides the following features, in addition to being advantageous similarly to its counterpart in the second embodiment. According to the fifth embodiment discussed above, the circuit design aiding apparatus 10b selects pin pairs only on the basis of source pings P1 in the first area 111. That is, the pair determination unit 17 determines source-pin pairs without taking into consideration the mapping of nets on target pins P1 in the second area 112. This is allowed in the case where the assignment of target pins is flexible. The determined source-pin pairs are then subjected to the coordination unit 21, which determines a set of target-pin pairs in such a way that the nets of each source-pin pair are connected to a pair of target pins P1 with a distance of 2 or less. The fifth embodiment thus makes it possible to use the wiring space more efficiently.

(f) Variations and Implementations

The above-described processing functions of the circuit design aiding apparatus 1, 10, 10a, and 10b may be performed by a plurality of processing devices in a distributed manner. For example, one processing device produces graphs L, R, and G and supplies the resulting pair candidates to another processing device. The latter processing device then chooses pairs of bus pins P1 from among the pair candidates.

The above sections have exemplified several embodiments of an apparatus, method, and computer program for aiding the user in designing an electronic circuit. It is not intended, however, to limit the embodiments to those examples. For example, the described components may be replaced with other components having equivalent functions. The embodiments may further include other components or processing operations. Where appropriate, two or more components and features provided in the embodiments may be combined in a different way.

The above-described processing functions may be implemented on a computer system. To achieve this implementation, the instructions describing the functions of a circuit design aiding apparatus 1, 10, 10a, or 10b are encoded and provided in the form of computer programs. A computer system executes those programs to provide the processing functions discussed in the preceding sections. The programs may be stored in a computer-readable storage medium. Such computer-readable storage media may include magnetic storage devices, optical discs, magneto-optical storage media, semiconductor memory devices, and other storage media for computers. Magnetic storage devices include hard disk drives, flexible disks (FD), magnetic tapes, and others. Optical discs include DVD, DVD-RAM, CD-ROM, CD-RW), and others. Magneto-optical storage media include magneto-optical discs (MO), for example.

Portable storage media, such as DVD and CD-ROM, are used for distribution of program products. Network-based distribution of software programs may also be possible, in which case several master program files are made available on a server computer for downloading to other computers via a network.

For example, a computer stores various software components in its local storage device, which have previously been installed from a portable storage medium or downloaded from a server computer. The computer executes programs read out of the local storage device, thereby performing the programmed functions. Where appropriate, the computer may execute program codes read out of a portable storage medium, without installing them in its local storage device. Another alternative method is that the user computer dynamically downloads programs from a server computer when they are demanded and executes them upon delivery.

It is further noted that the above processing functions may be executed wholly or partly by a central processing unit (CPU), microprocessor (MPU), digital signal processor (DSP), application-specific integrated circuit (ASIC), programmable logic device (PLD), or other processing device, or their combinations. Those devices are referred to collectively as "processors." As mentioned above, the proposed processing functions may be performed by a plurality of such processing devices. The person skilled in the art would appreciate that the term "processor" may refer not only to a single processing device, but also to a multiprocessor system including two or more processing devices.

(g) Conclusion

Various embodiments have been described above. According to an aspect of those embodiments, the proposed techniques make it easier to determine which pairs of nets to choose for wire routing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A circuit design aiding apparatus, comprising:
a memory configured to store information about first and second pin groups to be wired to each other, the information including logical connection data that associates pins in the first pin group with pins in the second pin group; and
a processor configured to perform a procedure including:
selecting a set of pair candidates each specifying a first pair of pins in the first pin group and a second pair of pins in the second pin group which are associated with each other by the logical connection data, wherein distance between the first pair of pins, as well as distance between the second pair of pins, is within a specified range; and
determining which pins in the first and second pin groups are to be wired in pairs, based on the selected set of pair candidates, wherein:
two pair candidates are said to be adjacent when the two pair candidates share a pin in the second pin group, and
the determining includes producing a graph whose nodes respectively represent the pair candidates in the selected set and whose edges represent adjacency of the pair candidates in the selected set, choosing a first node in preference to a second node in the produced graph when a smaller number of edges extend from the first node than from the second node, and determining that the first pair of pins in the pair candidate represented by the chosen first node be wired to the second pair of pins in the pair candidate represented by the chosen first node.

2. The circuit design aiding apparatus according to claim 1, wherein the determining repeats:
newly choosing one of the nodes in the graph; and
removing the chosen node, as well as edges extending therefrom, from the graph.

3. The circuit design aiding apparatus according to claim 1, wherein:
the determining includes calculating, for each of pair candidates represented by the first and second nodes in the graph when the first and second nodes are equal in the number of edges, a first total distance that is a sum of the distance between the first pair of pins in the first pin group and the distance of the second pair of pins in the second pin group; and the determining chooses the first node in preference to the second node when the first node has a smaller first total distance than the second node.

4. The circuit design aiding apparatus according to claim 3, wherein:

the determining further includes calculating a second total distance related to a specific node by adding up the distances of the first and second pair of pins of all the pair candidates represented as other nodes in the graph that have an edge to the specific node;

the determining executes the calculating of the second total distance for each of the first and second nodes when the first and second nodes are equal in both the number of edges and the first total distance; and the determining chooses the first node in preference to the second node when the first node has a larger second total distance than the second node.

5. The circuit design aiding apparatus according to claim 1, wherein:

the pins in the first and second pin groups are each given an identifier that indicates a category of signals assigned thereto; and the selecting selects each pair candidate by combining two pins having the same identifier.

6. The circuit design aiding apparatus according to claim 5, wherein the selecting selects pair candidates by using a factor that is determined from a combination of the identifiers of two pins, the factor indicating likelihood that the two pins are chosen to be wired in a pair.

7. A circuit design aiding method, comprising:

reading, by a processor, information about first and second pin groups to be wired to each other, the information including logical connection data that associates pins in the first pin group with pins in the second pin group;

selecting, by the processor, a set of pair candidates each specifying a first pair of pins in the first pin group and a second pair of pins in the second pin group which are associated with each other by the logical connection data, wherein distance between the first pair of pins, as well as distance between the second pair of pins, is within a specified range; and determining, by the processor, which pins in the first and second pin groups are to be wired in pairs, based on the selected set of pair candidates, wherein:

two pair candidates are said to be adjacent when the two pair candidates share a pin in the second pin group, and the determining includes producing a graph whose nodes respectively represent the pair candidates in the selected set and whose edges represent adjacency of the pair candidates in the selected set, choosing a first node in preference to a second node in the produced graph when a smaller number of edges extend from the first node than from the second node, and determining that the first pair of pins in the pair candidate represented by the chosen first node be wired to the second pair of pins in the pair candidate represented by the chosen first node.

8. A non-transitory computer-readable storage medium storing a program, the program causing a computer to perform a procedure comprising:

reading information about first and second pin groups to be wired to each other, the information including logical connection data that associates pins in the first pin group with pins in the second pin group;

selecting a set of pair candidates each specifying a first pair of pins in the first pin group and a second pair of pins in the second pin group which are associated with each other by the logical connection data, wherein distance between the first pair of pins, as well as distance between the second pair of pins, is within a specified range; and determining which pins in the first and second pin groups are to be wired in pairs, based on the selected set of pair candidates, wherein:

two pair candidates are said to be adjacent when the two pair candidates share a pin in the second pin group, and the determining includes producing a graph whose nodes respectively represent the pair candidates in the selected set and whose edges represent adjacency of the pair candidates in the selected set, choosing a first node in preference to a second node in the produced graph when a smaller number of edges extend from the first node than from the second node, and determining that the first pair of pins in the pair candidate represented by the chosen first node be wired to the second pair of pins in the pair candidate represented by the chosen first node.

* * * * *